United States Patent
Chou et al.

(10) Patent No.: US 6,532,562 B1
(45) Date of Patent: Mar. 11, 2003

(54) RECEIVER-DRIVEN LAYERED ERROR CORRECTION MULTICAST OVER HETEROGENEOUS PACKET NETWORKS

(76) Inventors: Philip A. Chou, 13525 NE. 50$^{th}$ St., Bellevue, WA (US) 98005; Albert S. Wang, 702 Kirkland Way, Unit 9, Kirkland, WA (US) 98033; Sanjeev Mehrotra, 8818 123$^{rd}$ land NE., Kirkland, WA (US) 98033

( * ) Notice: Subject to any disclaimer, the term of this patent is extended or adjusted under 35 U.S.C. 154(b) by 0 days.

(21) Appl. No.: 09/316,869

(22) Filed: May 21, 1999

(51) Int. Cl.$^7$ ................................................. G06F 11/00
(52) U.S. Cl. ....................... 714/746; 714/752
(58) Field of Search ................................ 370/216, 229, 370/432; 710/57, 130; 714/752, 820, 786, 748, 766, 746

(56) References Cited

U.S. PATENT DOCUMENTS

| | | | | |
|---|---|---|---|---|
| 5,345,565 A | * | 9/1994 | Jibbe et al. ................... | 710/130 |
| 5,463,643 A | * | 10/1995 | Gaskins et al. .............. | 714/766 |
| 6,031,818 A | * | 2/2000 | Lo et al. ....................... | 370/216 |
| 6,212,582 B1 | * | 4/2001 | Chong et al. ................. | 710/57 |
| 6,215,766 B1 | * | 4/2001 | Ammar et al. ............... | 370/229 |
| 6,266,339 B1 | * | 7/2001 | Donahue et al. ............. | 370/432 |
| 6,272,658 B1 | * | 8/2001 | Steele et al. ................. | 714/752 |

FOREIGN PATENT DOCUMENTS

EP   0 779 716   *  6/1997

OTHER PUBLICATIONS

Carle, G. and Biersack, E.: "*Survey of Error Recovery Techniques for IP–Based Audio–Visual Multicast Applications*" Institut EURECOM, Nov. 1997, pp. 24–36, XP–000737463.

Steven R. McCanne. Scalable Compression and Transmission of Internet Multicast Video. Report No. UCB/CSD–96–928, Computer Science Division (EECS), University of Claifornia, Berkeley,Dec. 1996.

* cited by examiner

*Primary Examiner*—David Ton
(74) *Attorney, Agent, or Firm*—Lyon & Harr; Mark Watson; Richard Lyon

(57) ABSTRACT

"Correction of errors and losses occurring during a receiver-driven layered multicast (RLM) of real-time media over a heterogeneous packet network such as the Internet is accomplished by augmenting RLM with one or more layers of error correction information. Each receiver separately optimizes the quality of received audio and video information by subscribing to at least one error correction layer. Ideally, each source layer in a RLM would have one or more associated multicasted error correction data streams (i.e., layers). Each error correction layer contains information that can be used to replace lost packets from the associated source layer. More than one error correction layer is proposed as some of the error correction packets contained in the data stream needed to replace the packets lost in the associated source stream may themselves be lost in transmission."

31 Claims, 17 Drawing Sheets

RECEIVER-DRIVEN LAYERED ERROR CORRECTION MULTICAST OVER HETEROGENEOUS PACKET NETWORKS

BACKGROUND

1. Technical Field

The invention is related to a system and process for correcting errors and losses occurring during a receiver-driven layered multicast of real-time media over a heterogeneous packet network such as the Internet.

2. Background Art

Real-time media, such as radio and television programs, are broadcast from a single sender to multiple, geographically distributed receivers, who have all "tuned" to that sender. Commonly, the signals are broadcast from the sender by a terrestrial antenna, but satellite and wired solutions also exist. For example, in cable TV, the signals are broadcast from a sender by propagating a voltage along a coaxial cable to receivers connected to the cable.

It is also possible to use the Internet infrastructure to broadcast audio and video information. This is typically accomplished using the Internet Protocol (IP) Multicast mechanism and its associated protocols. An Internet broadcast (or more properly, "multicast") is provided to the set of receivers who have first "subscribed" to the information. Specifically, through an announcement mechanism, such as a web page, a broadcaster announces the IP multicast group address to which it will send a particular broadcast. The multicast group address is just a special case of an ordinary IP address. However, unlike an ordinary address which is used to identify the "location" of a receiver where data is to be sent, a multicast group address is used by routers in the network to identify data being transmitted on the network as part of the broadcast, so that it can be routed to a subscribing receiver (who will have a completely different address). The receiver's address is not included in the broadcasted information.

A receiver subscribes to the broadcast by notifying the network that it wishes to "join" the multicast group. The subscriptions cause various routers in the network to update their states, to ensure that the multicast information eventually reaches the subscribers. At some point the sender begins to send packets to the specified address. When a router receives a packet with that address, it sends copies of the packet through each outgoing interface that leads to a subscriber. This causes the packets to reach the subscribers at some point, albeit with the inevitable packet loss due to network congestion and buffer overflow.

At a later point in time a receiver may unsubscribe for reasons that will be discussed later. This also causes the routers to update their states. If a router no longer has subscribers downstream from an interface, it stops copying the multicast packets to that interface. If a router no longer has subscribers downstream from any of its interfaces, then the router itself unsubscribes from the multicast group, and hence no longer receives (from upstream routers) multicast packets addressed to that group. This process is reversible, and dynamic. Receivers may subscribe and unsubscribe as many times as desired. Thus, information is propagated through the network only as necessary to reach currently subscribing receivers. The processes of subscribing and unsubscribing takes only fractions of a second, thereby network bandwidth is not wasted unnecessarily.

In the Internet, the channels between the sender and each receiver vary dramatically in capacity, often by two or three orders of magnitude. These differences in capacity exist because the data transmission rates associated with the connections to a particular receiver can vary (e.g., phone line capacity, LAN and/or modem speeds). This heterogeneity in capacity can cause problems in the context of an Internet broadcast of real-time audio and video information. For example, a particular receiver may not have the bandwidth available to receive the highest quality transmission that a broadcaster is capable of providing. One early attempt to cope with this problem involved broadcasting the audio and video data at different transmission rates to different multicast group addresses, with the quality being progressively better in the data broadcast at the higher rates. The receiver then subscribed to the transmission that suited its capability. However, this solution was very bandwidth intensive as the same information (and more) had to be repeated in each channel. To overcome this problem, an Internet broadcast can be transmitted via a "layered multicast". In a layered multicast, audio and video information is encoded in layers of importance. Each of these layers is transmitted in a separate data stream. A data stream is a sequence of packets all transmitted to the same multicast group address. The base layer is an information stream that contains the minimal amount of information, for the least acceptable quality. Subsequent layers enhance the previous layers, but do not repeat the data contained in a lower layer. Thus in order to obtain the higher quality, a receiver must subscribe to the lower layers in addition to the higher layers that provide the desired quality. For example, a video signal can be layered into packetized data streams of 8 Kbps (thousand bits per second). Each stream is sent to a different multicast group address. A receiver can subscribe to as many streams as it wants, provided the total bandwidth of the streams is not greater than the bandwidth of the most constrained link in the network between the sender and the receiver. For example, if the receiver is connected to the Internet by a 28.8 Kbps modem, then it can feasibly subscribe to one, two, or three 8 Kbps video layers. If it subscribes to more than three layers, then congestion will certainly result and many packets will be dropped randomly, resulting in poor video quality.

It has been proposed that the congestion problem be addressed using a "Receiver-driven Layered Multicast" (RLM) scheme, where each receiver attempts to optimize its received quality by subscribing to as many layers as possible without incurring substantial congestion and loss. It does this by "test joins," in which the receiver tentatively joins, or subscribes to, the multicast group containing the next layer. If performance improves, the test join is made permanent. Otherwise, the layer is dropped, i.e., the receiver unsubscribes from the multicast group. In addition, if performance degrades at any point during the multicast (due to congestion in the network), the topmost layer is dropped. However, in complex network environments such as the Internet, there is often congestion along the path between the sender and receiver that is "ambient" in the sense that it is due to cross traffic between other senders and receivers. Therefore, it is not always possible to eliminate all congestion along the path from a sender to a receiver by cutting back on the rate of transmission between the sender and receiver, i.e. , by dropping layers of the multicast. This presents a significant problem because in RLM the receiver attempts to drop multicast groups until there is little or no loss. When there is ambient congestion, this results in the receiver subscribing to few, if any, layers, which in turn results in sub-optimal video and audio quality.

Accordingly, there is a need for a system and process that can overcome the congestion issue and its concomitant packet losses, without eliminating so many multicast layers that the quality of the received audio and video information is unacceptable.

SUMMARY

The present invention accomplishes this task by, in essence, augmenting RLM with one or more layers of error correction information. This allows each receiver to separately optimize the quality of the received audio and video information by subscribing to at least one error correction layer. Thus, a unique receiver-driven, layered, error correction multicast system and process is created.

Ideally, each source layer in a RLM would have one or more multicasted error correction data streams (i.e., layers) associated therewith. Each of the error correction layers would contain information that can be used to replace lost packets from the associated source layer. More than one error correction layer is proposed as some of the error correction packets contained in the data stream needed to replace the packets lost in the associated source stream may themselves be lost in transmission. These lost error correction packets can be picked up by subscribing to a second error correction layer, and so on until all (or an acceptable number) of the source packets have been replaced, or there are no more additional error correction layers available.

The decision as to how many broadcast source layers and associated error correction layers to subscribe to at one time is in essence based on the inherent packet loss rate of the network connection and the maximum bandwidth available to the receiver. The idea is to subscribe to as many of the source layers as possible or desired, while leaving enough bandwidth available to also subscribe to the number of error correction layers for each source layer that will compensate for the inherent packet loss rate of the connection and provide an acceptable audio and video quality. It should be noted that there is also an option not to subscribe to any error correction layers. For example, in networks where the inherent packet loss rate is very low, the optimum quality might be obtained by subscribing to additional source layers and no error correction layers.

The decision logic could be viewed as a one time decision made prior to receiving the broadcast. However, the packet loss rate, or even the available bandwidth could fluctuate during the broadcast. Accordingly, the decision logic could also be implemented dynamically in that the number of source layers and associated error correction layers subscribed to is reevaluated on a periodic basis to ensure the optimum quality is maintained throughout the broadcast. It should be noted that this may entail unsubscribing to the topmost layer (or layers) at least temporarily to maintain a desired audio and video quality.

Any audio and/or video layering process currently used in RLM could feasibly be employed in conjunction with the above-described system and process to create the source layers. Likewise, any conventional process currently used in RLM can be adopted for encoding/decoding and packetizing/unpacketizing the audio and/or video signal in the present invention. Further, in regard to the error correction layers, it would be possible to use any currently existing error correction technique appropriate for packetized audio and video signals. For that matter, any combination of such existing error correction techniques could be employed.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
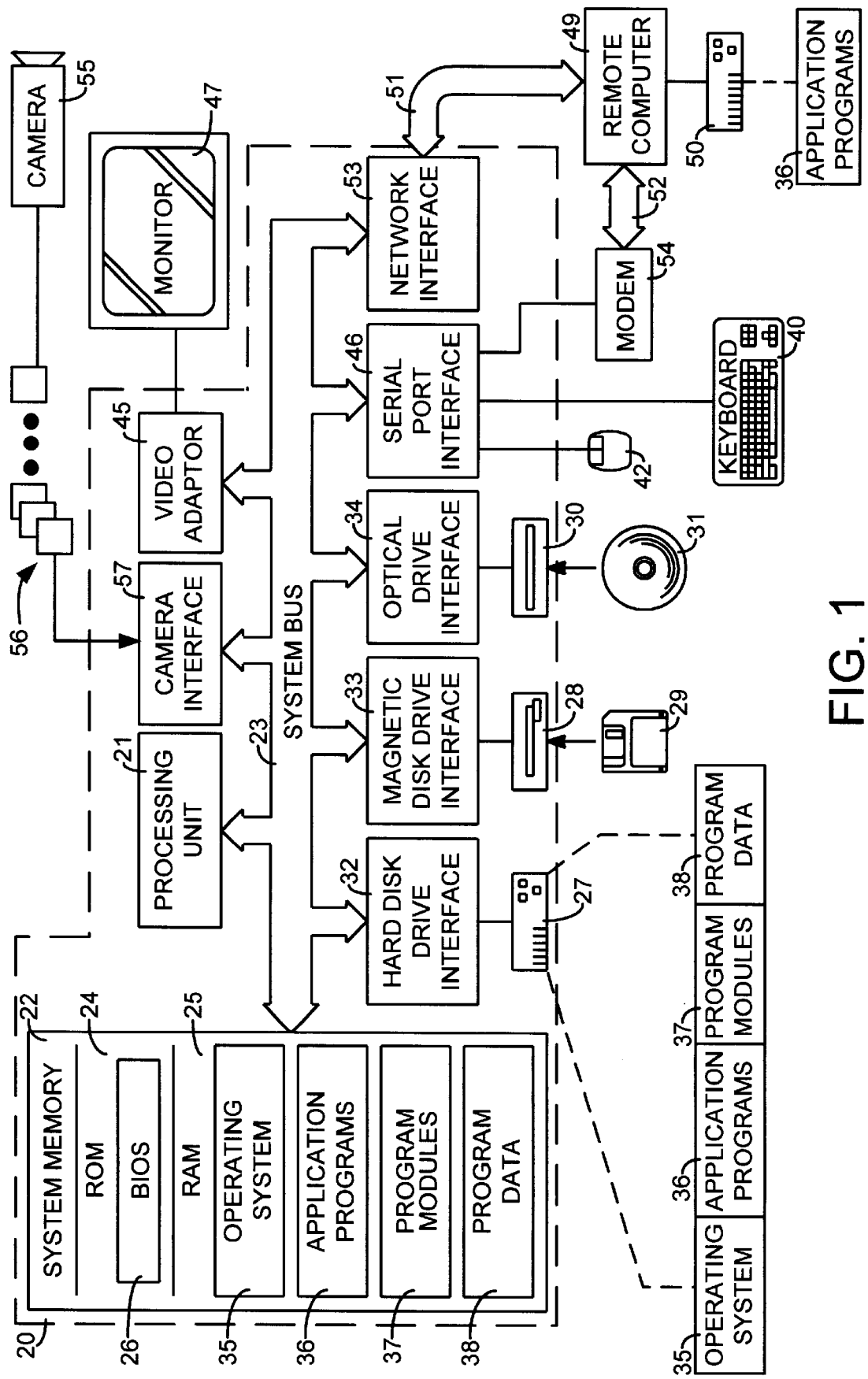
FIG. 1 is a diagram depicting a general purpose computing device constituting an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the invention.

1.0 Receiver-Driven Layered Error Correction

The present invention accomplishes the aforementioned task of overcoming the congestion issue and its concomitant packet losses by, in essence, augmenting RLM with one or more layers of error correction information. This allows each receiver to separately optimize the quality of the received audio and video information by subscribing to at least one error correction layer. Thus, a unique receiver-driven, layered, error correction multicast system and process is created.

It is noted that the term "layered" in the context of RLM refers to the fact that a base data stream is provided along with additional hierarchical enhancement layers which respectively add more and more data to progressively improve the quality of the signal eventually reconstructed from the layers. The aforementioned error correction data streams are not technically layers because each stream associated with a particular source layer provides the same error correction information. However, as viewed between source layers, the error correction data streams do provide different error correction information. Thus, while not technically correct, the error correction data streams will alternately be referred to as data or information streams, as well as layers in the description of the present invention.

Each source layer in a RLM would have at least one broadcasted error correction layers associated therewith, and ideally multiple error correction layers. Each of the error correction layers contains information that can be used, alone or in conjunction with other error correction layers, to replace lost packets from the associated source layer. The use of more than one error correction layer is preferred as some of the error correction packets contained in the error correction layer, which are needed to replace the packets lost in the associated source stream, may themselves be lost in transmission. These lost error correction packets can be picked up by subscribing to a second error correction layer, and so on until all (or an acceptable number) of the source packets have been replaced, or there are no more additional error correction layers available. In addition, in some circumstances as will be explained in more detail later, there may be too many missing source layer packets in a portion of the source data stream for a single error correction layer to provide all the replacements needed. Thus, having multiple error correction layers available for a given source layer improves the chances that all the missing source data packets in that layer can be replaced.

Figure 2:
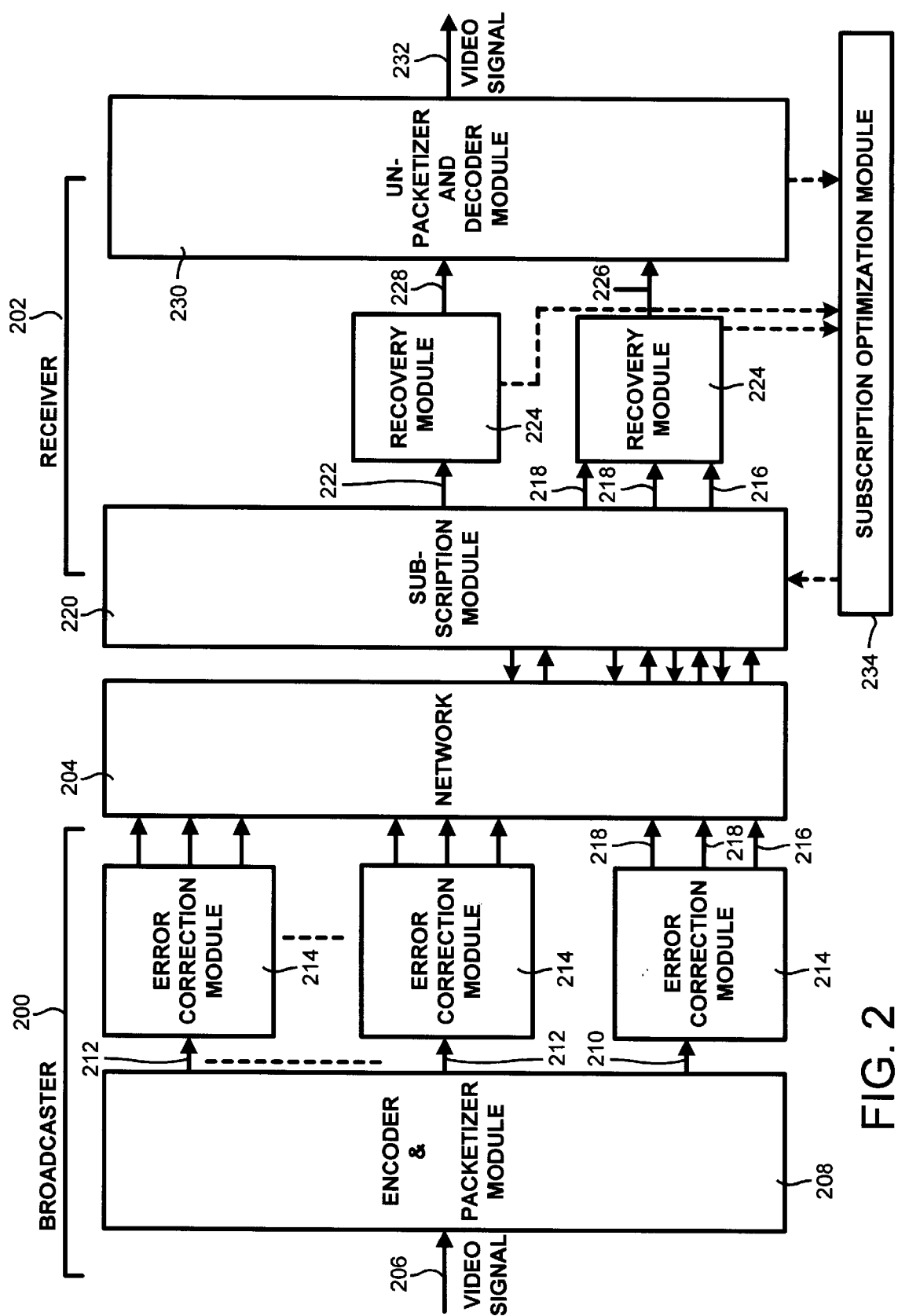
FIG. 2 is a diagram depicting an exemplary architecture for the receiver-based, layered, error correction multicast system according to the present invention.

The present invention can be implemented using the system architecture shown in FIG. 2. The depicted architecture is divided into two main parts, a broadcaster 200 and receiver 202, which are connected across a heterogeneous packet network 204, such as the Internet. The broadcaster 200 is associated with the source of the IP multicast and the receiver 202 is associated with a network user receiving the multicast. In the broadcaster 200, an audio and/or video signal 206 containing information that is to be broadcast is input into a encoder and packetizer module 208. This module 208 is responsible for creating the aforementioned source layers by encoding and packetizing the signal data into a series of data streams. This results in an output having a base layer 210, as well as one or more enhancement layers 212. The base layer 210 and each enhancement layer 212 are then processed by an error correction module 214 to create one or more error correction layers from the associated source layer. Each source layer and its associated error correction layers are then transmitted onto the network to separate multicast group addresses, as described previously. By way of an example, FIG. 2 depicts a source layer 216 and two error correction layers 218 being sent onto the network from each error correction module 214. Of course, more or fewer error correction layer streams could be sent as desired. Referring now to the receiver 202, some of the transmitted source layer streams, as well as their associated error correction layer streams, are received by a subscription module 220. This subscription module 220 subscribes to or unsubscribes from the various multicast group addresses so that the desired number of source and error correction layers are received. The subscription and un-subscription process proceeds in the network as described earlier in connection with the explanation of the RLM scheme. In the depicted example, the subscription module 220 is shown as subscribing to the base source layer 216 and two of its associated error correction layers 218, as well as the first enhancement source layer 222. Each received source layer and its associated error correction layers are fed into a recovery module 224 from the subscription module 220. The recovery module 224 uses the error correction layers (if present) to replace as many of the packets missing from the source layer as possible. The recovered source layers are then input into an unpacketizer and decoder module 230. In the depicted case, the recovered base source layer 226 and the first enhancement layer 228 are fed into this module 230. The unpacketizer and decoder module 230, as its name implies, unpacketizes each of the recovered source layers and decodes the layers to reconstruct the audio and/or video signal. The signal 232 is then output for further processing and use.

The decision as to how many broadcast source layers and associated error correction layers to subscribe to at one time is in essence based on the inherent packet loss rate of the network connection and the maximum bandwidth available to the receiver. The idea is to subscribe to as many of the source layers as possible or desired, while leaving enough bandwidth available to also subscribe to the number of error correction layers for each source layer that will compensate for the inherent packet loss rate of the connection and provide an acceptable audio and video quality. It should be noted that there is also an option not to subscribe to any error correction layers. For example, in networks where the inherent packet loss rate is very low, the optimum quality might be obtained by subscribing to additional source layers and no error correction layers.

The decision logic could be viewed as a one time decision made prior to receiving the broadcast. However, the packet loss rate, or even the available bandwidth could fluctuate during the broadcast. Accordingly, the decision logic could also be implemented dynamically in that the number of source layers and associated error correction layers subscribed to would be reevaluated on a periodic basis to ensure the optimum quality is maintained throughout the broadcast. It should be noted that this may entail unsubscribing to the topmost layer (or layers) as necessary to maintain a desired audio and video quality. The decision as to how many source and error correction layers to subscribe to at any one time is made in the subscription optimization module 234. This module 234 instructs the subscription module 220 how many source and error correction layers to subscribe to at any given time. As described above, this decision is based on the estimated maximum transmission rate as well as the packet loss rate. The necessary rate information is derived from inputs received from the recovery modules 224, and the unpacketizer and decoder module 230, as shown in FIG. 2.

Figure 3A:
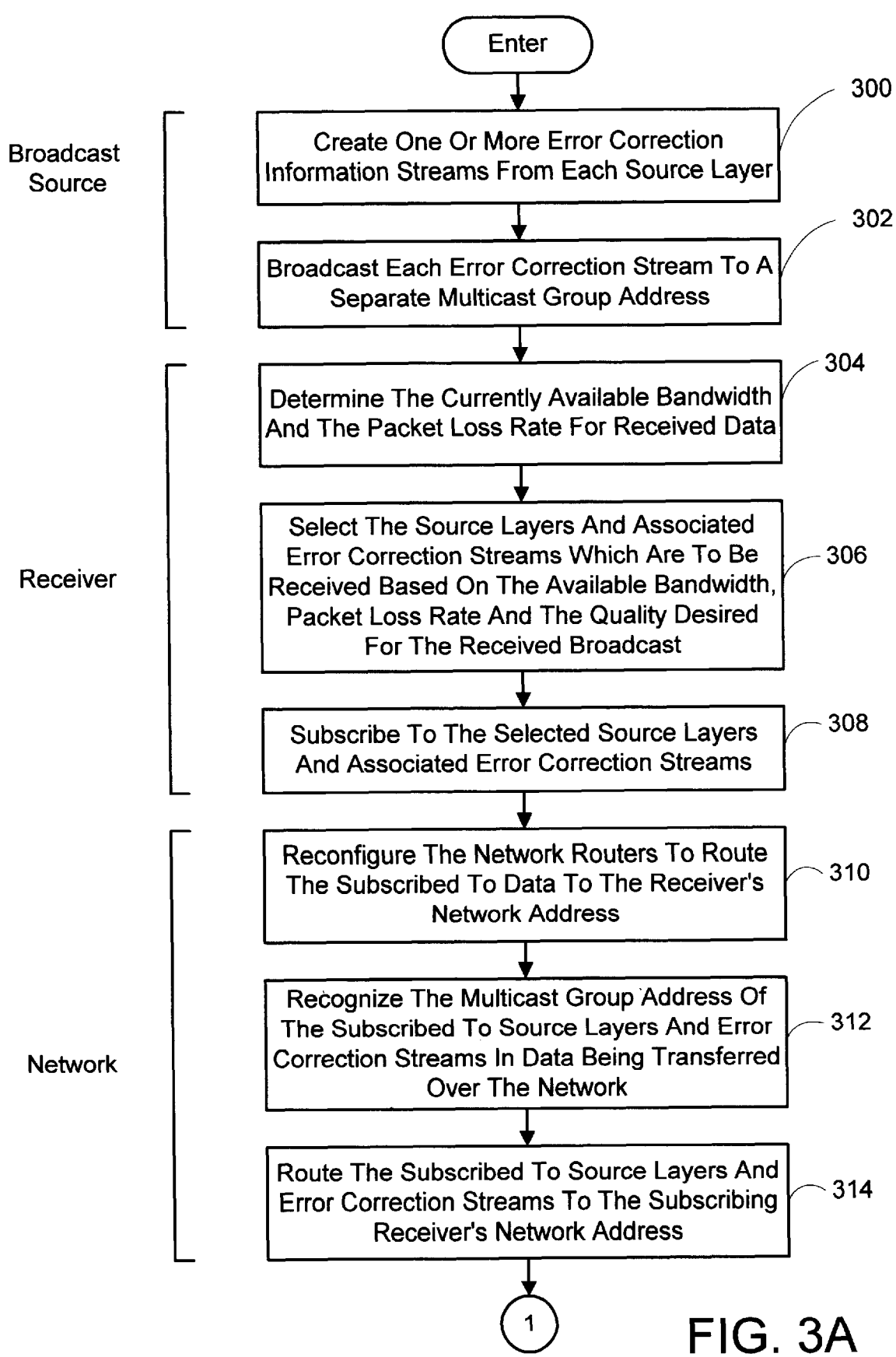
FIGS. 3A and 3B are block diagrams of an overall process for practicing the receiver-based, layered, error correction multicast system according to the present invention.
Figure 3B:
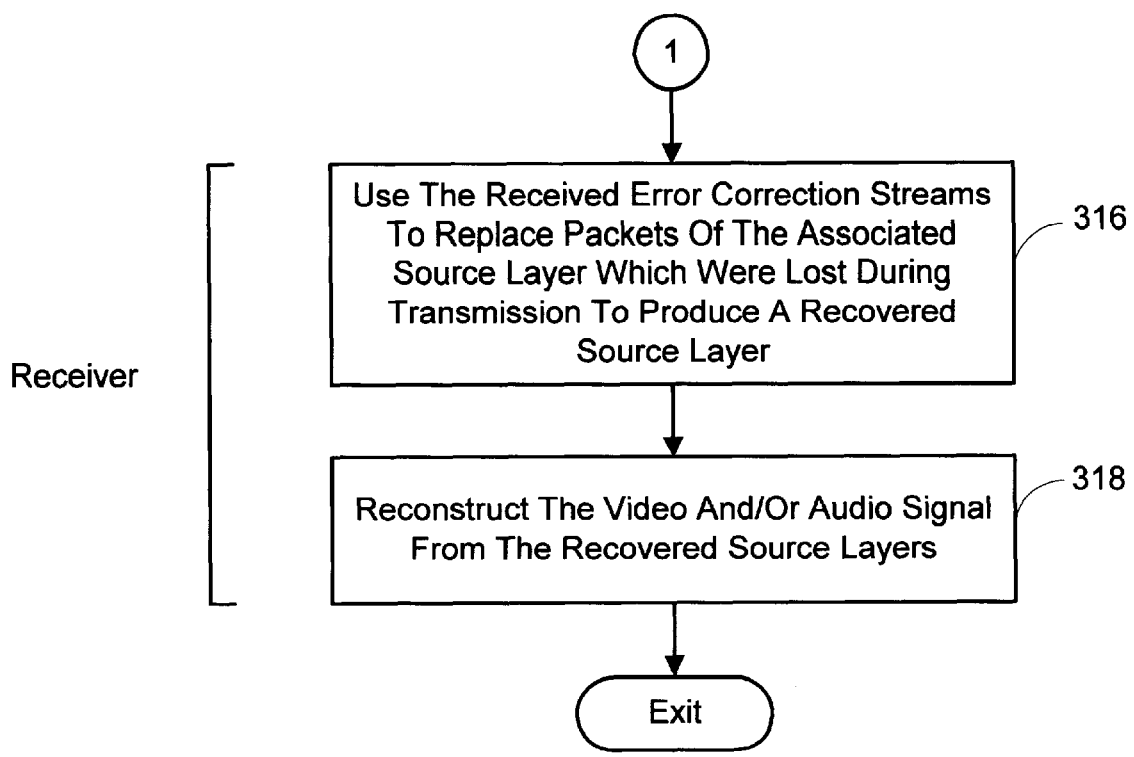

Referring to FIGS. 3A and 3B, a preferred process for implementing the receiver-driven, layered, error correction multicast system will now be described. The first two steps occur at the broadcast source. In step 300, one or more error correction streams are created from each source layer. The procedures that can be used to accomplish this task will be described in more detail later. Once the error correction streams have been created, they are broadcast along with the source layers (step 302 ). Each of the streams has a separate and unique multicast group address associated with it, as do the source layers.

The process now turns to the receivers of the broadcast. Each receiver first determines, prior to the broadcast, the currently available bandwidth and the packet loss rate being exhibited by received data (step 304). This information, along with the quality desired for the received broadcast, is employed in step 306 to select the source layers and associated error correction streams that are to be received to either optimize the quality or obtain the desired quality level. Finally, in step 308, the selected source layers and error correction streams are subscribed to by contacting the network and specifying which multicast group address it wants to receive.

The process then shifts to the network. In step 310, the network reconfigures to route the subscribed to data to the subscribing receiver's network address. This is accomplished by each router between the broadcast source and the receiver updating its routing table to include an output to either the receiver or the next closer router to the receiver. The network, via its routers, then recognizes the multicast group address of the subscribed to source layers and error correction streams in the data being sent over the network (step 312). These addresses are embedded in each data packet making up the source layers and error correction streams. The recognized source layers and error correction streams are then routed to the receiver in step 314.

The process then shifts back the receivers. Each receiver uses the received error correction streams to replace data packets of the associated source layer that were lost during transmission (step 316). This produces a recovered source layer. Finally, in step 318, each receiver reconstructs the video and/or audio signal from the recovered source layers.

Figure 4:
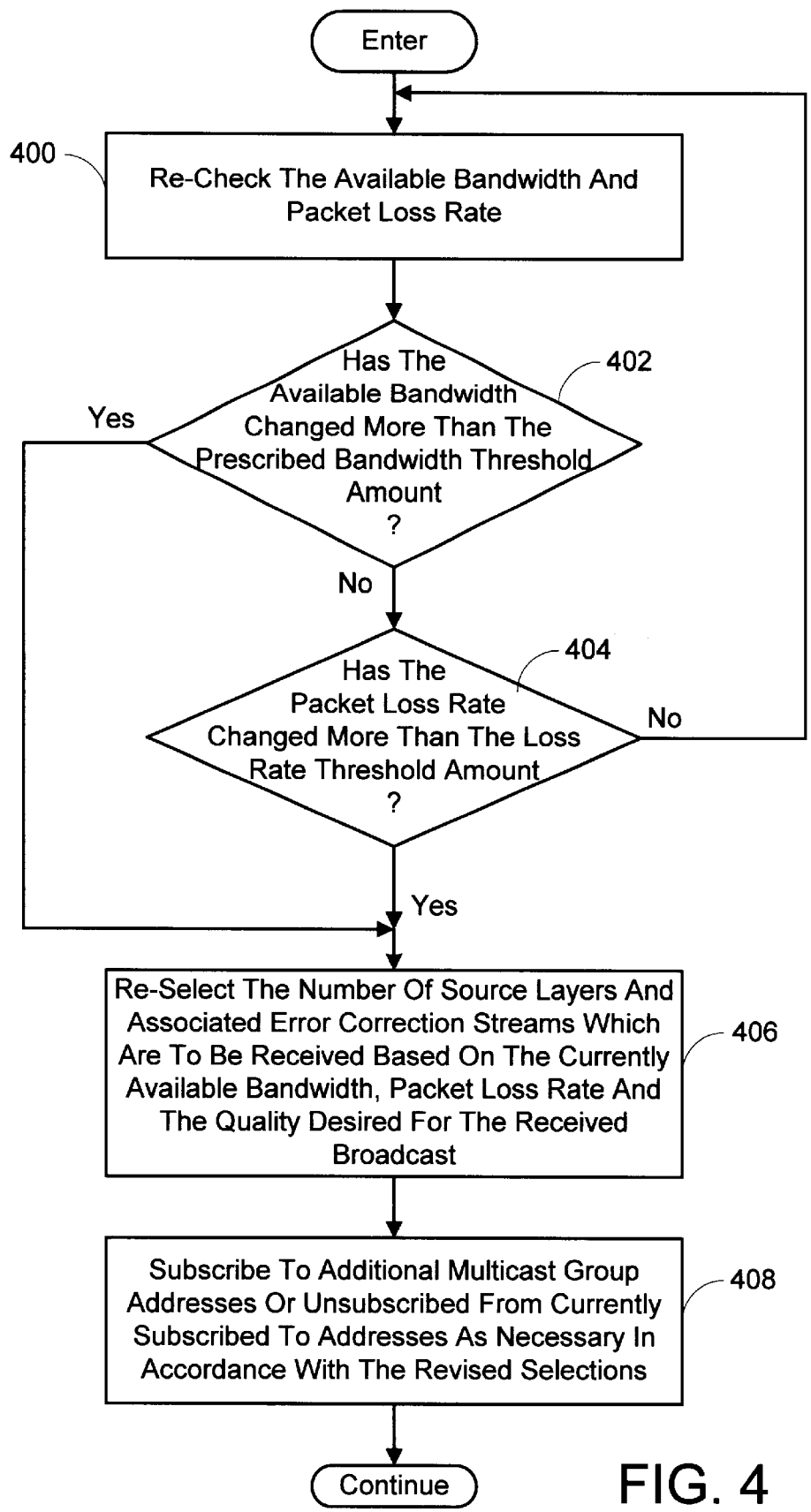
FIG. 4 is a block diagram of a process for monitoring available bandwidth and packet loss rates, and reacting to significant changes thereto, which is performed in conjunction with the overall process of FIGS. 3A and 3B.

The foregoing procedure assumes that the available bandwidth and packet loss rate will stay constant throughout the broadcast. However, this may not be the case, and the quality of the received video and audio could be degraded if the bandwidth drops or the loss rate increases significantly. Further, the bandwidth might increase, or the loss rate decrease. This would present an opportunity for a receiver to subscribe to more source layers or error correction layers (or both) to improve the quality. However, the aforementioned assumption would prevent a receiver from taking advantage of the opportunity to increase the quality of the re-constructed signal. Referring to FIG. 4, an optional procedure for monitoring the available bandwidth and packet loss rate during the broadcast and reacting to significant changes thereto is presented. Essentially, this process is entered once the broadcast begins and continues throughout the broadcast. In step 400, the receiver re-checks the available bandwidth and packet loss rate. As indicated by steps 402 and 404, if the available bandwidth changes more than a prescribed bandwidth threshold amount, or the packet loss rate changes more than a prescribed loss rate threshold amount, the process continues on to step 406. Otherwise, the re-checking step 400 is repeated. If the process proceeds on to step 406, the receiver re-selects the number of source layers and associated error correction streams which are to be received based on the currently available bandwidth, packet loss rate and the quality desired for the received broadcast. Based on this selection, the receiver subscribes to additional multicast group addresses or unsubscribes for currently subscribed to addresses, as necessary to optimize the quality of the received video and/or audio signal (step 408). It is noted that the bandwidth and loss rate thresholds are chosen such that the re-selection step 406 occurs only when the available bandwidth or packet loss rate has changed enough to warrant a re-evaluation of the source layers/error correction stream subscription status.

If the subscription status of a receiver changes due to the foregoing re-checking process, then the overall process continues as described in reference to FIGS. 3A and 3B, starting in step 310 with the network reconfiguring its routers to send just the currently subscribed to source layers and error correction streams to the receiver's address.

Any existing audio and/or video layer encoding/decoding process could feasibly be employed in conjunction with the above-described system and process to create the source layers at the broadcast source, as well as to reconstruct the video and/or audio signal from the source layers in the receiver. Likewise, any conventional process can be adopted for packetizing/unpacketizing the audio and/or video signal in the present invention.

In regard to the error correction layers, it would be possible to use any currently existing error correction technique appropriate for packetized audio and video signals. For that matter, any combination of such existing error correction techniques could be employed. However, it is preferred that two specific error correction methods, or that a combination of these two methods, be employed.

The first of these methods is an adaptation of an existing process known as Forward Error Correction (FEC). This is an error control coding method used to obtain reliable communications in a system susceptible to losses, such as the Internet. In essence, the FEC technique involves encoding the transmission data using a linear transform which adds redundant elements. The redundancy permits losses to be corrected because any of the original data elements can be derived from any of the redundant elements. Thus, as long as enough of the encoded data elements are received so as to equal the number of the original data elements, it is possible to derive all the original elements.

The second of the aforementioned preferred error correction techniques is new, but loosely based on an existing process called automatic repeat request (ARQ) protocol. In the ARQ protocols, the receiver is able to identify (e.g., via missing packet sequence numbers) which packets have been lost in transmission, and request retransmission of the lost packets from the sender. This process is typically impractical however in the context of a IP multicast on a large network such as the Internet because the broadcaster would be overwhelmed by retransmission requests from the receivers. In the aforementioned new error correction process, dubbed pseudo-ARQ, the receivers do not request retransmission of specific lost packets. Instead, the broadcaster sends not only the source packets in a primary stream, but also sends delayed versions thereof in one or more redundant streams to different multicast group addresses. In this way, the receiver can subscribe as necessary to one or more of the delayed streams to pick up those packets needed to replace lost packets in the primary streams. Thus, whereas in standard ARQ, the receiver sends repeat requests directly to the sender, in pseudo-ARQ, the receiver sends subscribe and unsubscribe messages (i.e., "join" and "leave" messages) to the network. Hence, there is no repeat-request implosion problem at the sender. The system scales up to millions of receivers in exactly the same way that IP Multicast and its companion protocols scale up. In fact, only the ordinary multicast group "join" and "leave" messages are used to implement pseudo-ARQ.

These two preferred error correction processes can also be combined to form an effective third process. Essentially, the combined process employs the aforementioned FEC coding techniques, except that the transmission of some or all of the redundant elements is delayed. In this way a receiver can subscribe to one of the delayed error correction streams to capture parity packets needed to compute replacements for lost source layer packets The two preferred error correction techniques, as well as the aforementioned combined technique will now be described in detail in the following sections.

2.0 Receiver-Driven Layered Error Correction Employing A Forward Error Correction (FEC) Technique Forward error correction codes are typically algebraic or convolutional codes with the following algebraic structure:

$$\begin{bmatrix} y_1 \\ y_2 \\ y_3 \\ \vdots \\ y_n \end{bmatrix} = \begin{bmatrix} a_{11} & a_{12} & \cdots & a_{1k} \\ a_{21} & a_{22} & \cdots & a_{2k} \\ a_{31} & a_{32} & \cdots & a_{3k} \\ \vdots & \vdots & \ddots & \vdots \\ a_{n1} & a_{n2} & \cdots & a_{nk} \end{bmatrix} \begin{bmatrix} x_1 \\ x_2 \\ \vdots \\ x_k \end{bmatrix} \quad (1)$$

Here, $n > k$, and $y_1, \ldots y_n$ is an encoding of the data $x_1, \ldots, x_k$. Thus, instead of sending the original source data, $x_1, \ldots, x_k$, the encoded data $y_1, \ldots y_n$ (or "codeword") is sent. Since $n > k$, there is redundancy. This redundancy permits losses to be recovered and errors to be corrected. Only particular values of the codeword $y_1, \ldots y_n$ are allowed. Because of this constraint, if any of the components of y are missing, they can be replaced, provided at least k of them are actually received. The source data $x_1, \ldots, x_k$ can then be found by solving the above linear equation. Note that the elements $y_i$, $x_j$, and $a_{ij}$ are all elements of a finite field, such as bits or bytes, and that multiplication and division are carried out in that finite field. For example, in the binary field, addition is carried out modulo 2. The "rate" of the code is given by the ratio k/n. The rate is the number of source symbols transmitted per encoded symbol. The higher the rate, the more source information can get through with a given transmission rate, but the lower the redundancy, hence the fewer error or losses that can be tolerated. In the context of the present invention, it is preferable to choose a code rate that will ensure the desired quality in reception in view of the anticipated packet loss rate of the network, assuming the transmission rate is not so large at that code rate that the available bandwidth of a typical receiver is unacceptably monopolized by the error correction stream.

Different FEC codes have different properties. FEC codes in which the source data appears directly in the codeword (e.g., $y_i = x_i$ for $i=1, \ldots, k$) are called "systematic" codes. FEC codes at different rates $k/n_1, k/n_2, \ldots$ that are nested (in the sense that for each source vector $x_1, \ldots, x_k$, their $n_i$-dimensional codewords $y_1, \ldots y_{n1}, y_1, \ldots y_{n2}, \ldots$ are prefixes of one another) are called "rate-compatible" codes. Thus a code such as the one shown in the equation above can give rise to a whole family of rate-compatible codes, simply by deleting some of the rows at the bottom of the matrix.

In the context of packet networks such as the Internet, if the rows of the source data matrix $$X = \begin{bmatrix} x_{11} & x_{12} & \cdots & x_{1m} \\ x_{21} & x_{22} & \cdots & x_{2m} \\ \vdots & \vdots & \ddots & \vdots \\ x_{k1} & x_{k2} & \cdots & x_{km} \end{bmatrix} \quad (2)$$

represent the m bytes in each of k fixed-length source packets, then the rows of the encoded data matrix $$Y = \begin{bmatrix} y_{11} & y_{12} & \cdots & y_{1m} \\ y_{21} & y_{22} & \cdots & y_{2m} \\ y_{31} & y_{32} & \cdots & y_{3m} \\ \vdots & \vdots & \ddots & \vdots \\ y_{n1} & y_{n2} & \cdots & y_{nm} \end{bmatrix} = \begin{bmatrix} a_{11} & a_{12} & \cdots & a_{1k} \\ a_{21} & a_{22} & \cdots & a_{2k} \\ a_{31} & a_{32} & \cdots & a_{3k} \\ \vdots & \vdots & \ddots & \vdots \\ a_{n1} & a_{n2} & \cdots & a_{nk} \end{bmatrix} X \quad (3)$$

can represent the m bytes in each of n FEC packets. If the FEC code is systematic (i.e., the original source code is included therein), then the first k FEC packets will be identical to the k source packets. If the FEC code is rate-compatible, then FEC codes with increasing redundancy can be generated simply by adding "parity" packets to the first k, up to a total of n packets.

Figure 5:
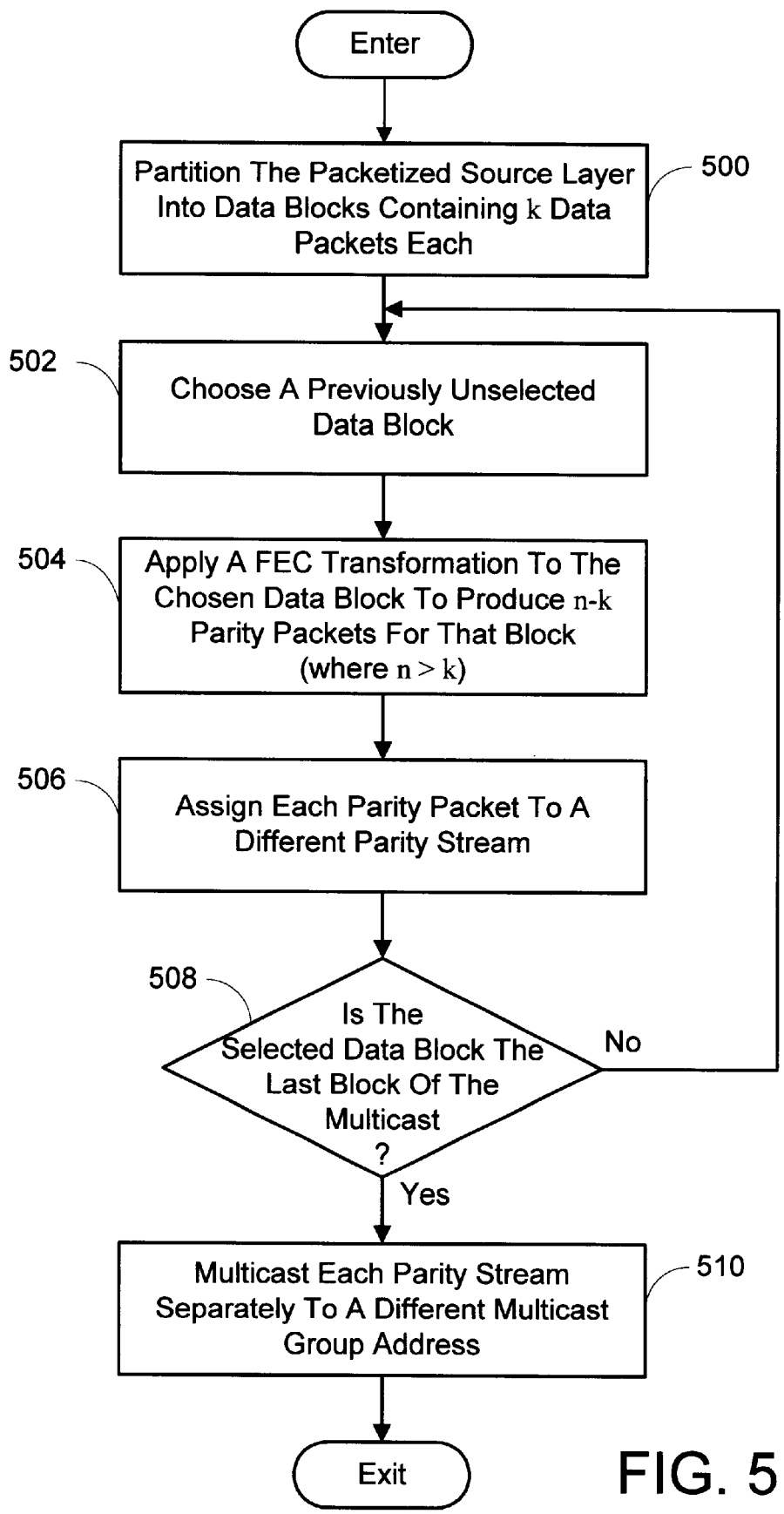
FIG. 5 is a block diagram of a process for practicing the receiver-based, layered, error correction multicast system according to the present invention wherein parity layers to be used in the error correction are generated using an adapted Forward Error Correction (FEC) technique.

As discussed previously, in standard RLM, the source is encoded in layers, and each layer is transmitted in a separate data stream. The present FEC error correction process augments RLM by producing error correction (or parity) layers that go along with each source layer. The general process of forming these parity layers for any one of the source layers is shown in FIG. 5. In step 500, the packets in a source layer are partitioned into k packets per block, forming for each block a k by m matrix of bytes, X (where m is the number of bytes in each packet). Then, in step 502, a previously unselected block is selected. A forward error correction code such as that described above is applied to the chosen block in step 504, to produce an n by m matrix of bytes Y, which forms n−k parity packets (in addition to the original k source packets if the code is systematic) for that data block. Each of these n−k parity packets is then assigned to a different parity stream in step 506. Thus, there will be n−k parity streams for every source layer. As indicated in step 508, if the currently selected block is not the last block in the multicast, then steps 502 through 506 are repeated for the next data block. Otherwise the process proceeds on to step 510 where each parity stream is transmitted separately to a different multicast group address (as is the associated source layer). It is noted that the foregoing process can be accomplished ahead of time and the parity streams produced stored until the time of the multicast. However, alternatively, the parity streams can be produced and multicast as each block of the source layer is multicast, thus resulting in a real-time generation of the parity streams and no need to store them.

As a concrete example of the foregoing process, suppose the video source is encoded into 8 Kbps layers, such that each layer produces one packet per second, each packet containing 1 Kbytes of information. Suppose then that every three seconds, k=3 packets are blocked together into a 3×1 Kbyte matrix X. Then suppose that for each such block of packets, n=12 packets are produced (as a 12×1 Kbyte matrix Y). The first k=3 of these are source packets, while the last n−k=9 are parity packets (i.e., the FEC code used was of the systematic type). Each parity packet is transmitted in a separate stream, forming 9 different parity streams for that source layer, each having a bit rate of 2.67 Kbps (one 1 Kbyte packet every 3 seconds). If there are 10 source layers, and each source layer has 9 parity layers, then there are a total of (1+9)×10=100 streams. If a receiver is connected over a 28.8 modem, and the ambient packet loss rate is 50%, then it may decide to subscribe to two 8 Kbps source layers, plus three 2.67 Kbps parity layers for the first source layer and no parity layers for the second source layer (for a total of 24 Kbps). It is well known that allowing unequal error protection for each source layer can optimize quality.

Figure 6:
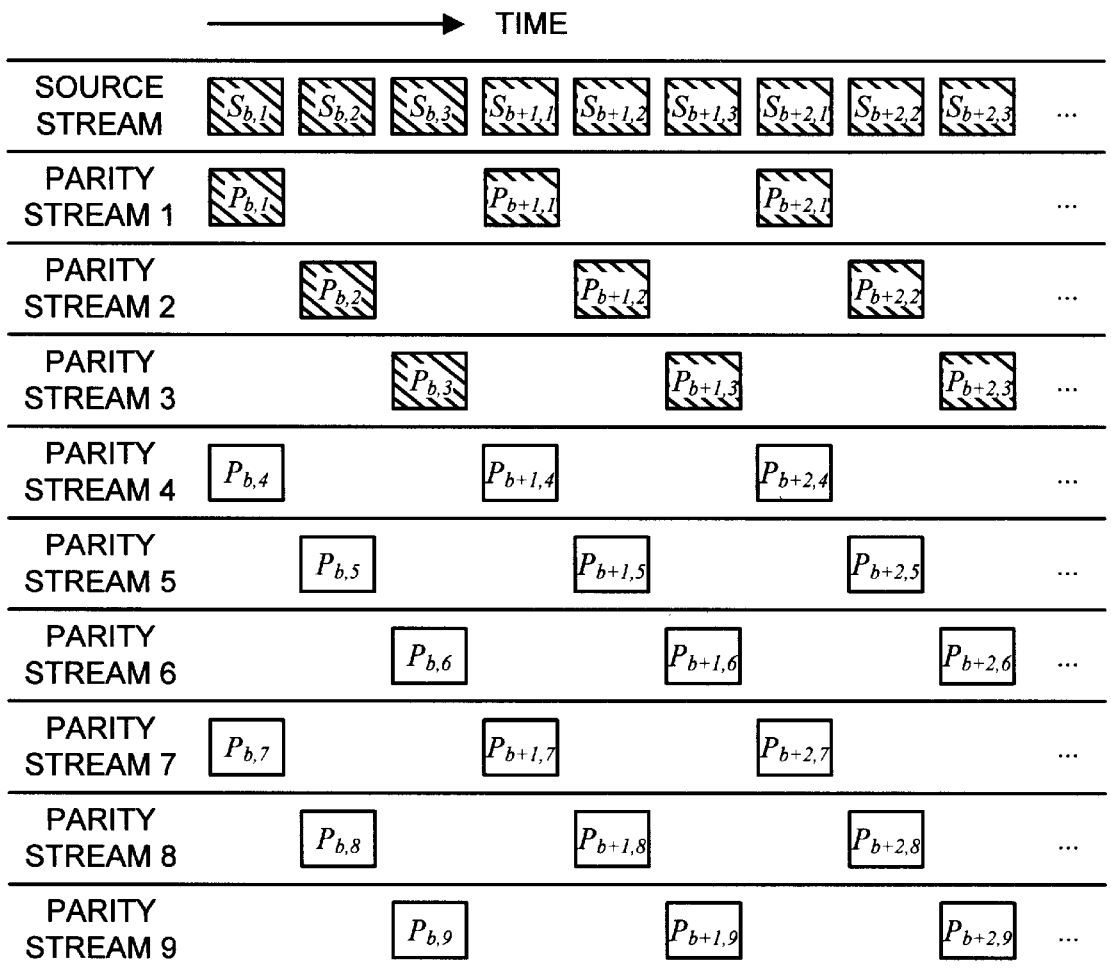
FIG. 6 is a diagram depicting the relative flow of data packets for a source stream and nine associated parity streams generated via the FEC technique of FIG. 5.

The diagram of FIG. 6 illustrates the streams associated with the base source layer in the above example. Each stream constitutes a sequence of packets transmitted to the same multicast group address. The source stream is segmented into blocks, with k=3 packets per block. The source packets in block b are labeled $S_{b,1}$, $S_{b,2}$, and $S_{b,3}$, and the corresponding n−k=9 parity packets are labeled $P_{b,1}, \ldots, P_{b,9}$. In subsequent blocks, the source packets are designated by the labels $S_{b+1,1}$, $S_{b+1,2}$, and $S_{b+1,3}$, and so on, with the associated parity packets being labeled $P_{b+1,1}, \ldots, P_{b+1,9}$, and so on. It is noted that the parity packets are shown staggered in time, however, this need not be the case. Each parity packet associated with a source layer block can be transmitted at anytime during the transmission of that associated source block. It is also noted that the patterned packets in FIG. 6 are the ones to which the receiver in the above example subscribes.

Figure 7:
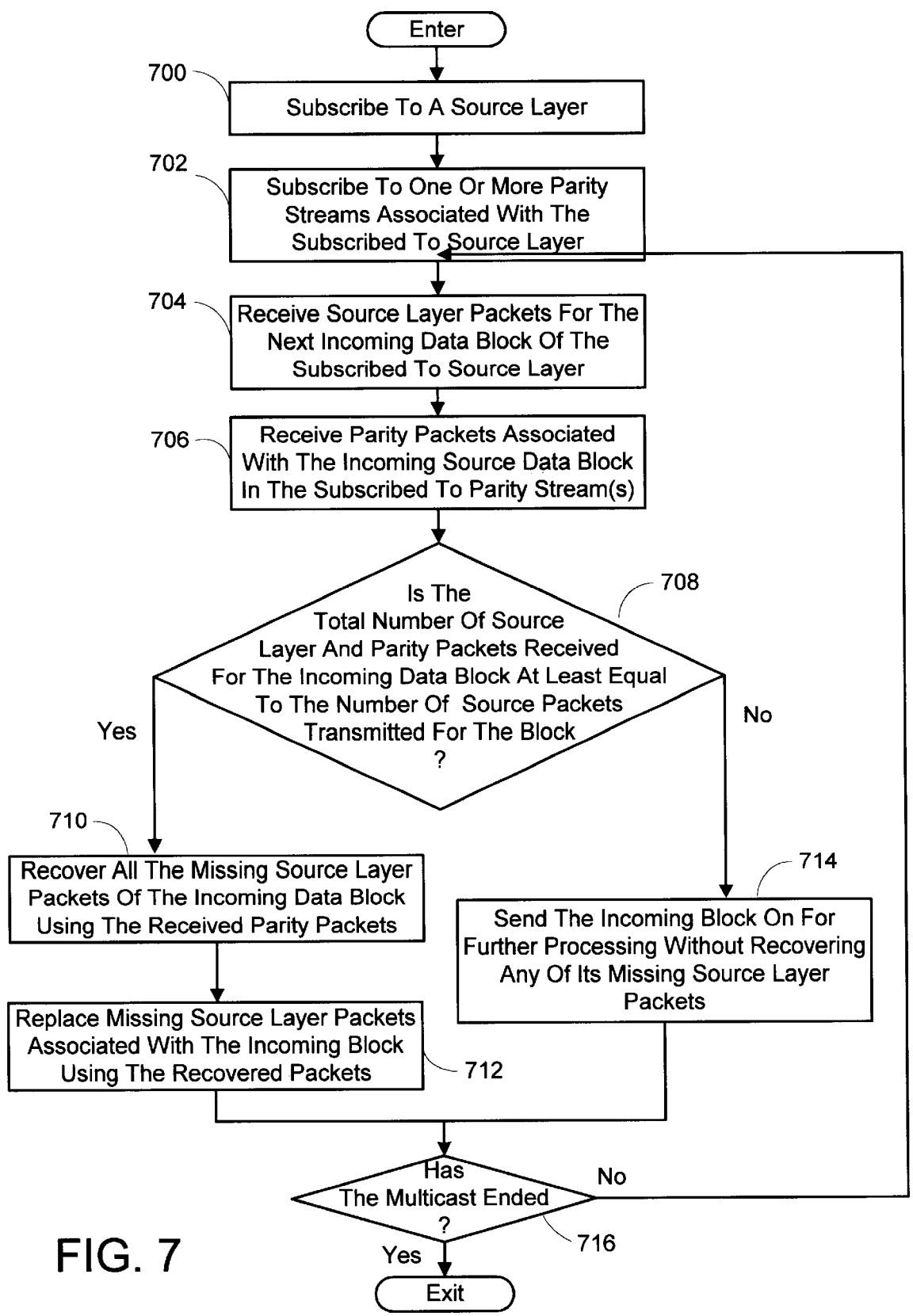
FIG. 7 is a block diagram of a process for practicing the receiver-based, layered, error correction multicast system according to the present invention wherein a receiver subscribes to the parity streams generated by the process of FIG. 5 and uses the parity streams to replace source layer packets lost during transmission.

Referring to FIG. 7, the receiver's side of the process will now be described. The first step 700 involves the receiver subscribing to a source layer. It is noted that the following description will use just one subscribed to source layer as an example of the process. It should be understood that the process is identical for each source layer subscribed to by a receiver. In step 702, the receiver also subscribes to one or more parity streams associated with the source layer. Once the multicast begins, the receiver begins receiving source layer packets partitioned in to data blocks as discussed previously (step 704). In addition, the receiver receives parity packets associated with the incoming source layer data block in the subscribed to parity stream or streams (step 706). Once all the source layer and parity stream packets for an incoming data block have been received (less any packets lost during transmission), it is determined whether the total number of these packets is at least equal to the number of source packets transmitted for the block, as indicated in step 708. This can be accomplished, for example, by employing the sequence numbers these packets typically have embedded within the data making up the packet. Thus, it is readily apparent which packets are missing and the number of source layer packets originally multicast can be computed by adding the number of missing packets to the number of packet received. If it is determined that the total number of source layer and parity stream packets received for the incoming block equal or exceed the number of source packets transmitted for that block, then all the missing source layer packets in the block are recovered using the received parity packets (step 710). This is accomplished by solving Equation (1) for the particular FEC code employed. The missing source layer packets associated with the incoming data block are then replaced with the aforementioned recovered packets in step 712. If, however, it is determined that the total number of source layer and parity stream packets received for the incoming block do not equal or exceed the number of source packets transmitted for that block, then the incoming block is sent on for further process without recovering any of its missing packets (step 714). The all or nothing nature of this process derives from the previously discussed fact that if any of the components of y are missing, they can be replaced, provided at least k of them are actually received. This means that if enough source layer and parity stream packets are received, despite losses during transmission, to equal or exceed the number of source layer packets originally transmitted, then all of the missing source layer packets can be recovered. However, if the total source layer and parity streams packets received is less that the original number of source layer packets sent, none of the. missing source layer packets can be recovered.

The foregoing recovery and replacement process (of steps 704 through 714) is repeated for each block of source layer packets received, as indicated by step 716. Preferably, this is accomplished as each block arrives so as to minimize the delay in reconstructing the video and/or audio signal from the source layers and to minimize the amount of data that needs to be stored.

It is apparent from the foregoing process that by having many source layers, and many parity layers for each source layer, each receiver is able to independently subscribe to the optimal number of source layers, and the optimal number of parity layers for each source layer, so as to maximize quality for a given transmission rate and the packet loss rate of the network connection.

3.0 Receiver-Driven Layered Error Correction Employing A Pseudo Automatic Repeat Request (Pseudo-ARQ) Technique Automatic repeat request (ARQ) protocols are commonly used in lossy packet networks. The ubiquitous TCP/IP is an example of such a protocol. In ARQ protocols, the receiver is able to identify which packets have been lost in transmission. The receiver is then able to request that the sender repeat the lost information. Although it may take many re-transmissions, the lost information is eventually recovered. Hence, the overall communication is "reliable" (i.e., without loss). ARQ is a very efficient mechanism that makes optimal use of the capacity of the forward transmission channel in that information is repeated only as necessary. Furthermore, it adapts naturally to the channel capacity, whatever it may be. This contrasts with FEC codes, whose redundancy is chosen to match a particular loss rate. For example, an FEC code with 25% redundancy (n/k=1.25) is approximately optimal for channels that lose 1 in every 5 packets. If this FEC code is used, and the losses of the channel changes over time, then the code is no longer optimal. It is sending either too much parity information, or too little. The overall communication is not reliable, because the FEC method may occasionally fail, if too many packets are lost within a single block. On the other hand, because ARQ protocols adapt to the channel capacity, they have unbounded delay, while FEC has a guaranteed delay before decoding is possible. Of course, if a bounded delay is required (such as for real-time video), ARQ can be used until the delay bound is reached, after which point the method fails. In this case, the overall communication may be unreliable.

For the above reasons, ARQ is usually preferred to FEC whenever it is available. Unfortunately, ARQ is not usually feasible in broadcast scenarios. In the IP Multicast scenario, a feedback channel is usually available from each receiver to the sender. However, it is usually considered not to be feasible for millions of receivers to feed back packet re-transmission requests to a single sender. Not only would hundreds of thousands of simultaneous feedback requests "implode" upon the sender, but also it would not be feasible for the sender to send out hundreds of thousands of individual (i.e., unicast) re-transmissions to the receivers.

The present invention introduces a pseudo-ARQ for real-time multicast transmission. In pseudo-ARQ, the sender multicasts the source packets in a primary stream, and also multicasts delayed versions of the source packets in one or more redundant streams. If a receiver loses a packet from the primary stream, then it has the opportunity to subscribe to the first of the redundant streams, in an attempt to recover the packet. If that fails too, then the receiver has the opportunity to subscribe to the second redundant stream, and so forth, until either the receiver recovers the desired packet, or there are no more streams to subscribe to. Once the lost packet is recovered from a subscribed to error correction data streams, or if the packet could not be recovered from that stream, the receiver can unsubscribe from the stream to conserve the available bandwidth. An error correction data stream would then be re-subscribed to the next time a source data packet is discovered missing. This frees up bandwidth and can provide an opportunity to subscribe to an additional source layer if sufficient bandwidth exists. Alternatively, one or more of the redundant error correction data streams can be permanently subscribed to during the broadcast to ensure quick access to replacement packets, albeit at the expense of bandwidth. It is also noted that there are only a finite number of redundant streams because there is a delay bound before which the real-time media must be decoded for presentation to the user.

Figure 8A:
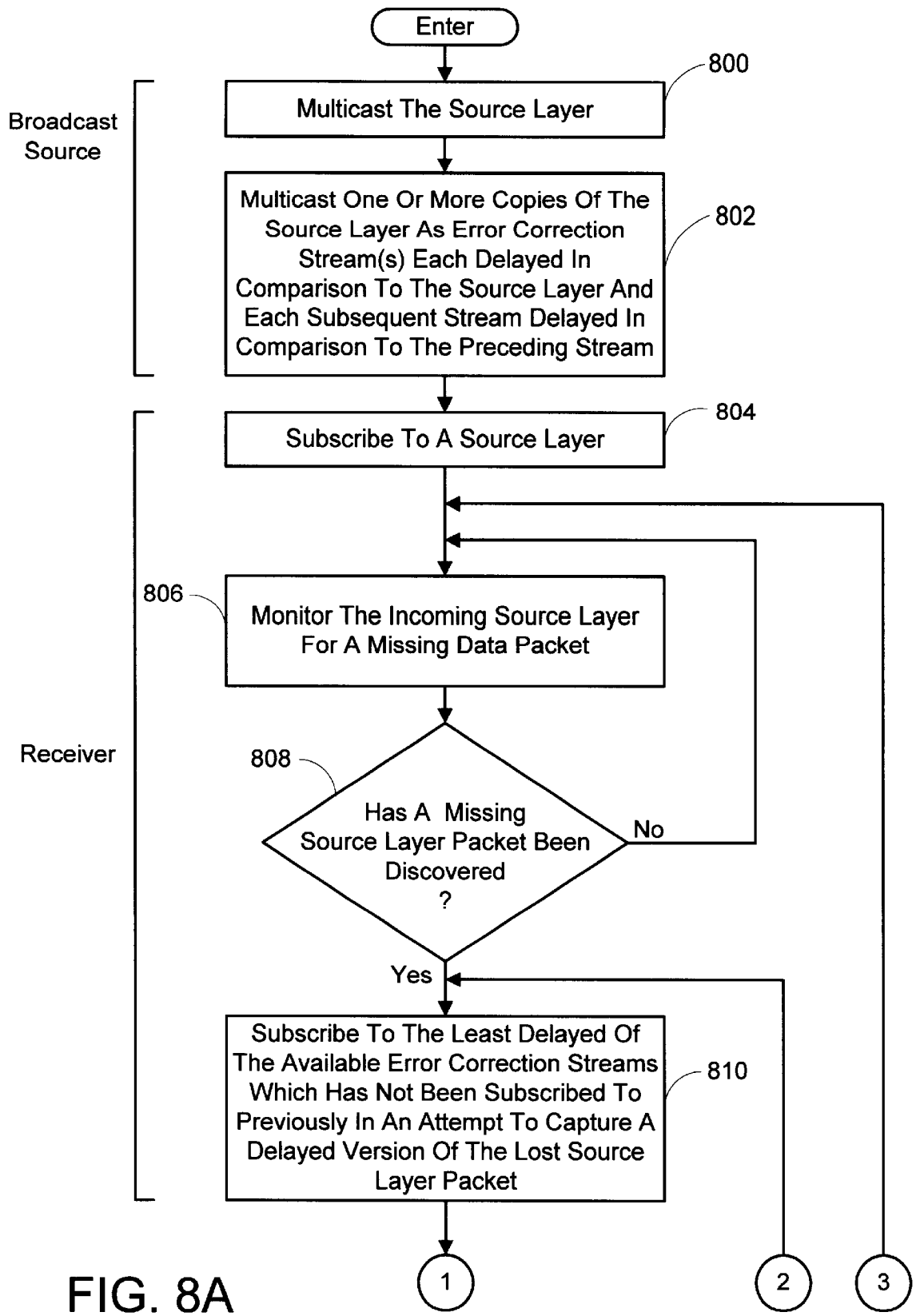
FIGS. 8A and 8B are block diagrams of a process for practicing the receiver-based, layered, error correction multicast system according to the present invention wherein error correction layers are generated using a pseudo-Automatic Repeat Request (ARQ) technique, and wherein a receiver subscribes to the error correction streams and uses them to replace source layer packets lost during transmission.
Figure 8B:
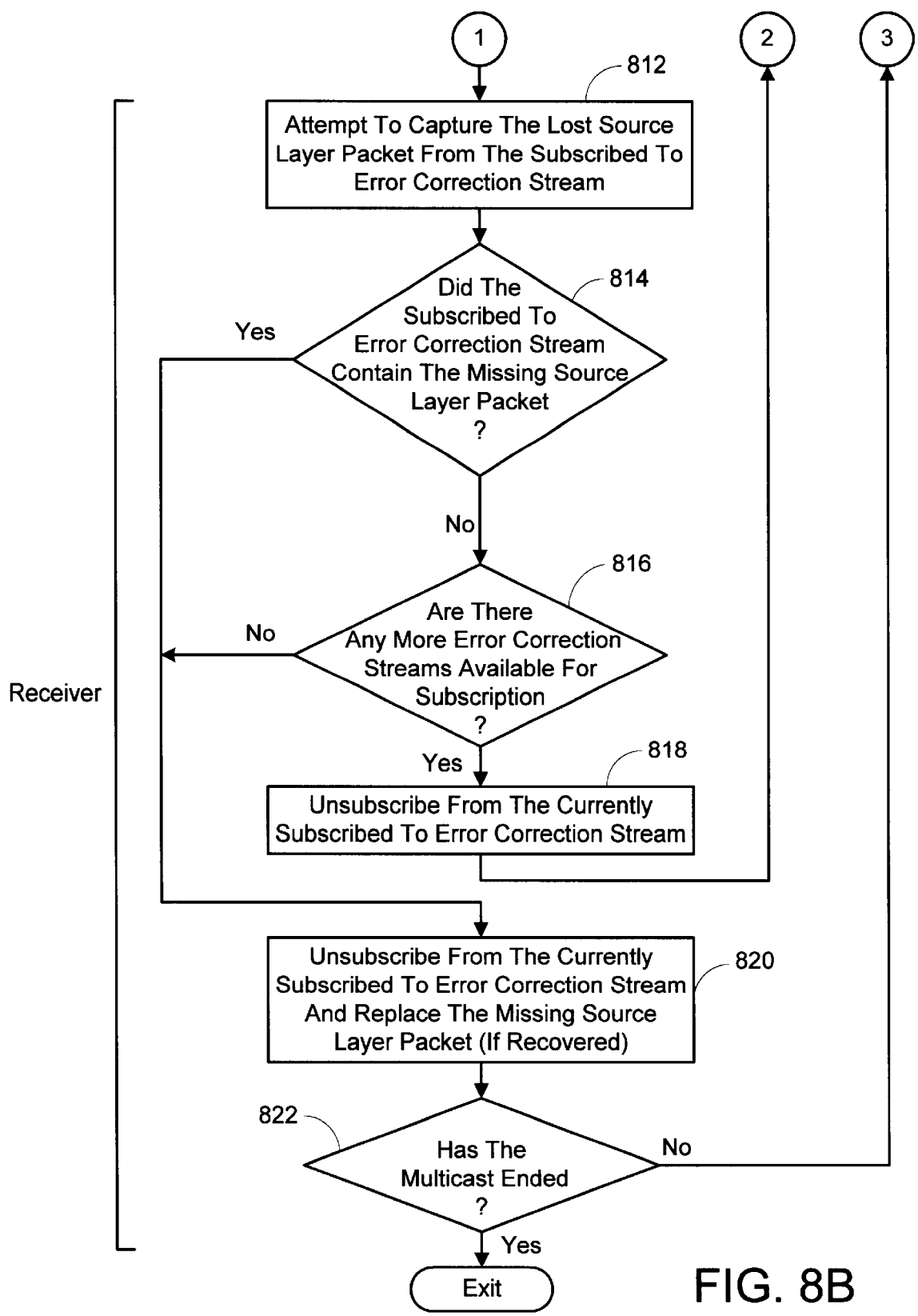

The technique involving continuous subscribing and unsubscribing to error correction data streams will now be described in detail with reference to FIG. 8. It is noted that the process is described in the context of one of the source layers and its associated error correction layers, but is applicable to all the other source and error correction layers as well. In step 800, the broadcaster multicasts a source layer of video and/or audio in a data stream. In addition, the broadcaster multicasts one or more delayed versions of the source layer as error correction layers (step 802). The delay period for the first error correction layer is chosen such that a receiver has time to detect the loss of an incoming data packet in the source layer and subscribe to one of the delayed error correction layers before a replacement packet in the error correction layer arrives. Likewise the delay period for each successive error correction layer is chosen so that a receiver has time to detect the loss of a needed replacement data packet in an error correction layer and to subscribe to the next subsequent error correction layer to obtain that data packet.

The next step in the process involves a receiver subscribing to one of the source layers (step 804). All the receivers subscribe to the base layer (i.e., the primary data stream). A receiver may also subscribe to one or more of the enhancement source layers, as desired. Each receiver attempts to reconstruct a subscribed to source layer from the received packets. The first step 806 in this task is to monitor the incoming source layer to determine if a source layer packet has been lost during transmission (via missing packet sequence numbers, for example). As indicated in step 808, the monitoring procedure continues until a missing source data packet is discovered. At that point, the receiver subscribes to an error correction stream (step 810). Specifically, the receiver subscribes to the error correction stream currently having the least amount of delay of the available streams. Then, in step 812, the receiver attempts to capture the delayed version of the lost source layer packet from the subscribed to error correction stream. As indicated in step 814, if it is discovered that the needed replacement packet is not contained in the subscribed to error correction stream (such as might happen if the packet was lost during transmission), then it is determined whether there are any more error correction streams available for subscription (step 816). If there are more error correction streams available, then the receiver unsubscribes from the current stream and steps 810 through 818 are repeated. This entails, among other things, subscribing to a different error correction stream—specifically, the stream having the least amount of delay in comparison to any of the other available streams (excluding the ones already used). If, however, the subscribed to error correction stream did contain the missing packet, or if there were no other error correction streams available for subscription, then the process proceeds to step 820. In this step, the receiver unsubscribes from the currently subscribed to error correction stream and replaces the missing source layer packet with the identical error correction layer packet, if it was recovered. Finally, as indicated in step 822, the process of monitoring the incoming source layer and replacing lost source layer packets (i.e., steps 806 through 818) is continuously repeated, until such time as the broadcast ends.

Figure 9:
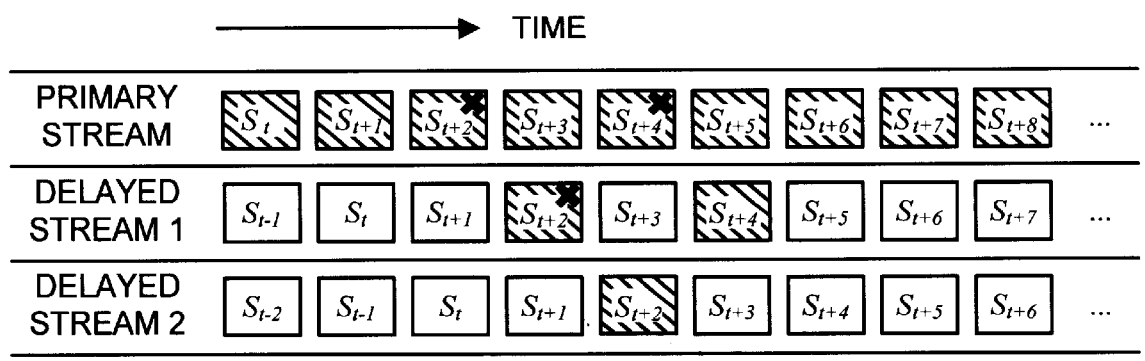
FIG. 9 is a diagram depicting the relative flow of data packets for a primary source stream and two delayed error correction streams generated via the pseudo-ARQ technique of FIGS. 8A and 8B.

The diagram shown in FIG. 9 depicts the content of three pseudo-ARQ data streams as they are transmitted over time (i.e., one source or primary stream and two delayed error correction streams). In this diagram, the patterned packets are the packets to which the receiver subscribes at any given time, and the data packets are labeled according to time (e.g. $S_t$ is the packet received at time=0, $S_{t+1}$ is a packet received at time=1, and $S_{t-1}$ is a packet in a delayed stream representing a source data packet preceding the $S_t$ packet by one time period). The X's indicate packets that are lost in transmission. The receiver always subscribes to the packets in the primary stream. In addition, the receiver subscribes and unsubscribes to the first delayed stream twice—once in an attempt to recover packet $S_{t+2}$ and once to recover packet $S_{t+4}$. The receiver also subscribes and unsubscribes to the second delayed stream once to recover packet $S_{t+2}$ which was missing from the first error correction data stream. Meanwhile other packets are still being transmitted in the primary stream. Note that in some time intervals, the receiver subscribes to multiple streams simultaneously. For a fixed-rate communication channel (such as a modem), this might seem problematic. In practice, however, the channel is shared by many streams (e.g., for each source layer). A conventional overall rate-control mechanism, such as that employed in standard RLM, is employed to ensure a constant bit rate through the channel, possibly by adding or dropping less important layers. For example, a higher-level source layer may have to be dropped (i.e., unsubscribed from) in order to subscribe to an error correction layer associated with a lower-level source layer to replace lost data packets in that lower-level layer. Of course, the higher level source layer could be re-subscribed to once the lost packet is retrieved.

It is noted that in the foregoing example there were two error correction layers available. However, it is not intended to limit the invention to two layers. Rather, one layer could be employed, or more than two with the maximum number limited only by the maximum acceptable delay. If the missing source layer packet cannot be retrieved from the available error correction layers, then the packet is simply not replaced and the video and/or audio signal is reconstructed without it, albeit at lower quality.

4.0 Receiver-Driven Layered Error Correction Employing A Hybrid FEC and Pseudo-ARQ Technique Pseudo-ARQ and FEC techniques can be advantageously combined.

Figure 10:
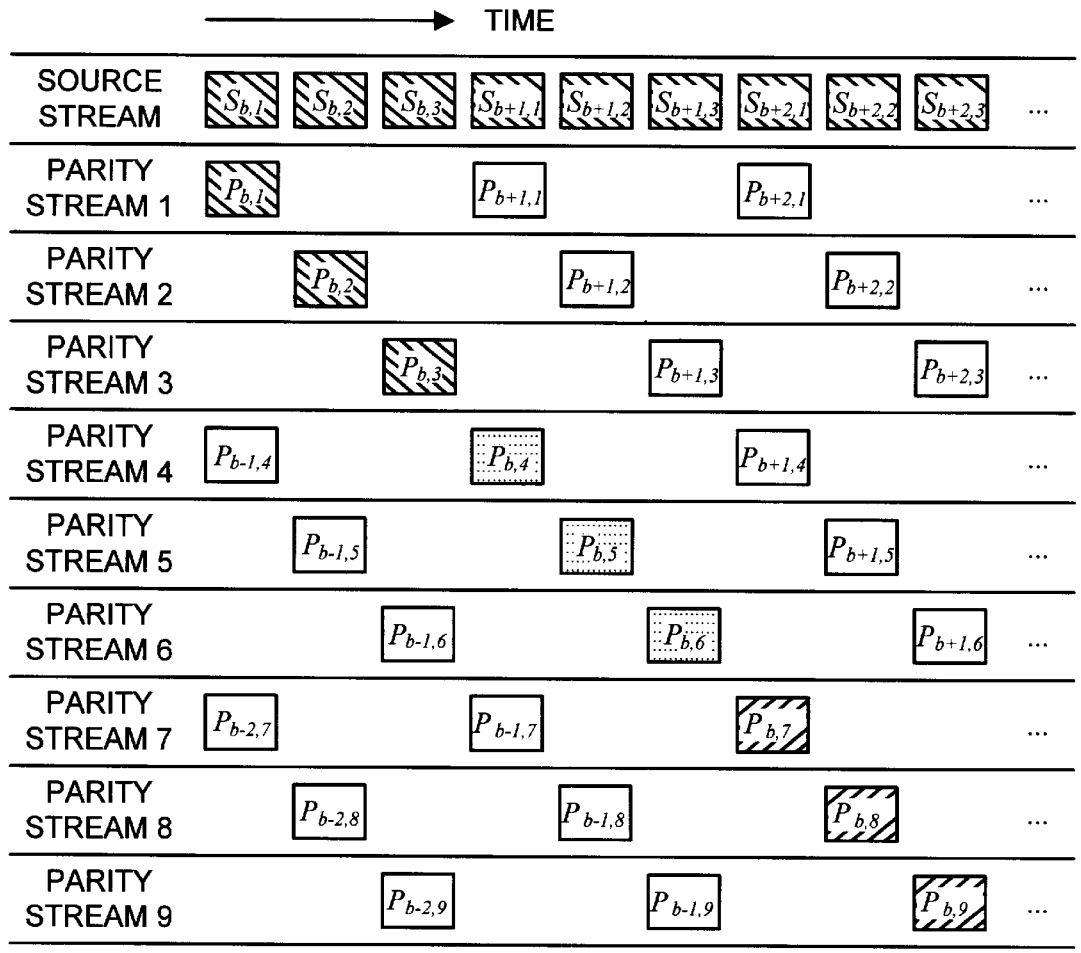
FIG. 10 is a diagram depicting the relative flow of data packets for a source stream, three parity streams, and six delayed parity streams generated via a hybrid FEC/pseudo-ARQ error correction technique.

This can be done as follows. As in FEC, the b'th block of k source packets, say $S_{b,1}, \ldots, S_{b,k}$, can be protected with n–k parity packets, say $P_{b,1}, \ldots, P_{b,n-k}$. However, these parity packets can be partitioned into "waves" with different delays, as in pseudo-ARQ. Each wave could include any desired number of parity streams, each of which would exhibit the same delay. For example, suppose k=3 and n=12, as in the FEC example above. Then the packets can be arranged in waves as depicted in the diagram of FIG. 10.

In the diagram, the heavily textured parity packets $(P_{b,1}, \ldots, P_{b,3})$ are in the first wave of packets for a block $(S_{b,1}, \ldots, S_{b,3})$, the stippled parity packets $(P_{b,4}, \ldots, P_{b,6})$ are in the second wave of packets for the same block, and the medium textured parity packets ($P_{b,7}, \ldots, P_{b,9}$) are in the third wave of packets for this block. It is noted that the parity packets associated with a particular source layer block (e.g., $P_{b,1}, \ldots, P_{b,6}$) are shown staggered in time in FIG. 10 between parity streams in the same wave. However, this need not be the case. Each parity packet associated with the same block in a wave could also be transmitted at the same time if desired.

The hybrid FEC/pseudo-ARQ process in the depicted example differs from the pure FEC example simply in that streams 4–6 are delayed by three packets and streams 7–9 are delayed by six packets. This permits the receiver to subscribe to additional parity information in a later wave if the number of parity packets lost in the current wave results in fewer parity packets than missing source packets. As described previously, it does not matter which parity packets associated with a block of source data are used to compute replacements for source layer packets missing in that block. However, the total number of source layer and parity stream packets received must still at least equal the number of source layer packets transmitted for each data block, or none of the missing packets can be recovered. Therefore, the receiver is able to pick up missing parity packets for a block on demand in delayed parity stream rather than subscribing to many parity streams throughout the multicast to ensure enough are received to recover all the missing source layer packets—a significant advantage over using FEC techniques alone.

Another major advantage of the above hybrid FEC/pseudo-ARQ scheme, this time over a pure pseudo-ARQ scheme, is that rather than sending a copy of every source stream packet making up a block in an error correction stream, only one parity packet need be sent which multiple receivers can use to recover different source packets belonging to the block associated with the parity packet. This makes for an efficient use of shared network bandwidth. For example, two receivers may have a different loss pattern (of two losses) in a particular block of source data. But both receivers can still subscribe to the same parity packet associated with that block to try to recover the losses. Because the parity streams contain parity packets rather than a copy of a source packet, these packets can be used to recover different source packets in the same block. This reduces the network bandwidth shared by all receivers, because the receivers can capture the same packet, rather than many different packets, to recover different loss patterns. In an extreme case, where the block length is long (say 100 packets), all receivers having only a few losses in the long block can recover the losses by capturing the same few parity packets, regardless of where the losses occurred in the block.

Figure 11:
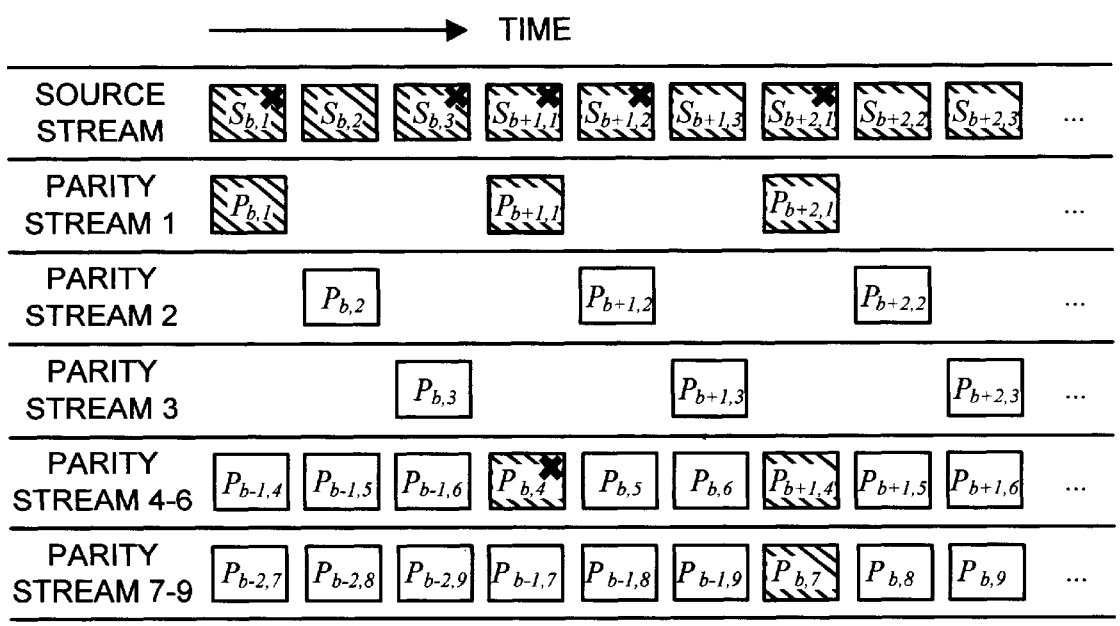
FIG. 11 is a diagram depicting the relative flow of data packets for a source stream, three parity streams, and two collapsed delayed parity streams generated via a hybrid FEC/pseudo-ARQ error correction technique.

Referring now to the diagram of FIG. 11, a further refinement of the combined error correction process is shown. Specifically, the last six parity streams are collapsed into two parity streams. The advantage of collapsing multiple streams into a single stream is that the receiver can then subscribe and unsubscribe to the single stream as necessary to obtain the packets it needs, rather than subscribing and unsubscribing to multiple streams. This efficiency comes at the price though in that the subscription and unsubscription operations must be accomplished quickly to ensure the parity packets associated with a particular source data block being processed are captured. However, if the receiver is capable of quickly capturing the required packets, subscribing to collapsed error correction streams can be quite advantageous.

Referring to FIG. 11, an example of the use of the hybrid FEC/pseudo-ARQ error correction process will now be given. In the diagram, the textured packets are the packets to which the receiver subscribes at any given time. It is noted that the block nomenclature used in connection with the diagrams of FIGS. 6 and 9 is employed here as well, and the X's still indicate packets that are lost in transmission. In this example, the receiver always subscribes to the packets in the source stream and in parity stream 1. As it requires one parity packet associated with a particular block of the source stream to compute each replacement for a lost packet from that stream, parity packet $P_{b,1}$ from parity stream 1 can be used to compute a replacement for source stream packet $S_{b,1}$. Likewise, parity packets $P_{b+1,1}$ and $P_{b+2,1}$ from parity steam 1 can be used to compute replacements for lost source stream packets $S_{b+1,1}$ and $S_{b+2,1}$, respectively. However, there are no parity packets in parity stream 1 to use in computing replacements for the lost source stream packets $S_{b,3}$ and $S_{b+1,2}$. It will be remembered that the total number of source layer and parity packets associated with a source layer block that were received must equal or exceed the number of source layer packets transmitted, or none of the missing source layer packets can be recovered. Therefore, the receiver subscribes and unsubscribes to parity stream 4–6 twice. It subscribes a first time in an attempt to receive parity packet $P_{b,4}$ to compute a replacement for lost source stream packet $S_{b,3}$. In addition, it subscribes a second time to capture the parity packet $P_{b+1,4}$ which can be used to compute a replacement for source stream packet $S_{b+2,1}$. Next, since the attempt to capture parity packet $P_{b,4}$ was unsuccessful as it was missing from the combined parity stream 4–6, the receiver also subscribes and unsubscribes to the second delayed parity stream 7–9 once to receive packet $P_{b,7}$ which can be used to compute a replacement for source stream packet $S_{b,3}$. This process can be repeated using additional collapsed (or uncollapsed if that is the only type available) parity streams until sufficient parity packets have been captured to recover all the lost source layer packets associated with each source layer block.

It is noted that the first three parity streams (1–3) in the diagram of FIG. 11 could also be collapsed to form a first collapsed parity stream, if desired. The receiver would subscribe on a long-term basis to the source stream and the first collapsed parity stream. The other delayed parity streams would only be subscribed to capture parity packets needed to compute replacements for source packets lost during transmission. Once the parity packet is obtained, the receiver can unsubscribe from the parity stream, thereby conserving bandwidth.

Figure 12A:
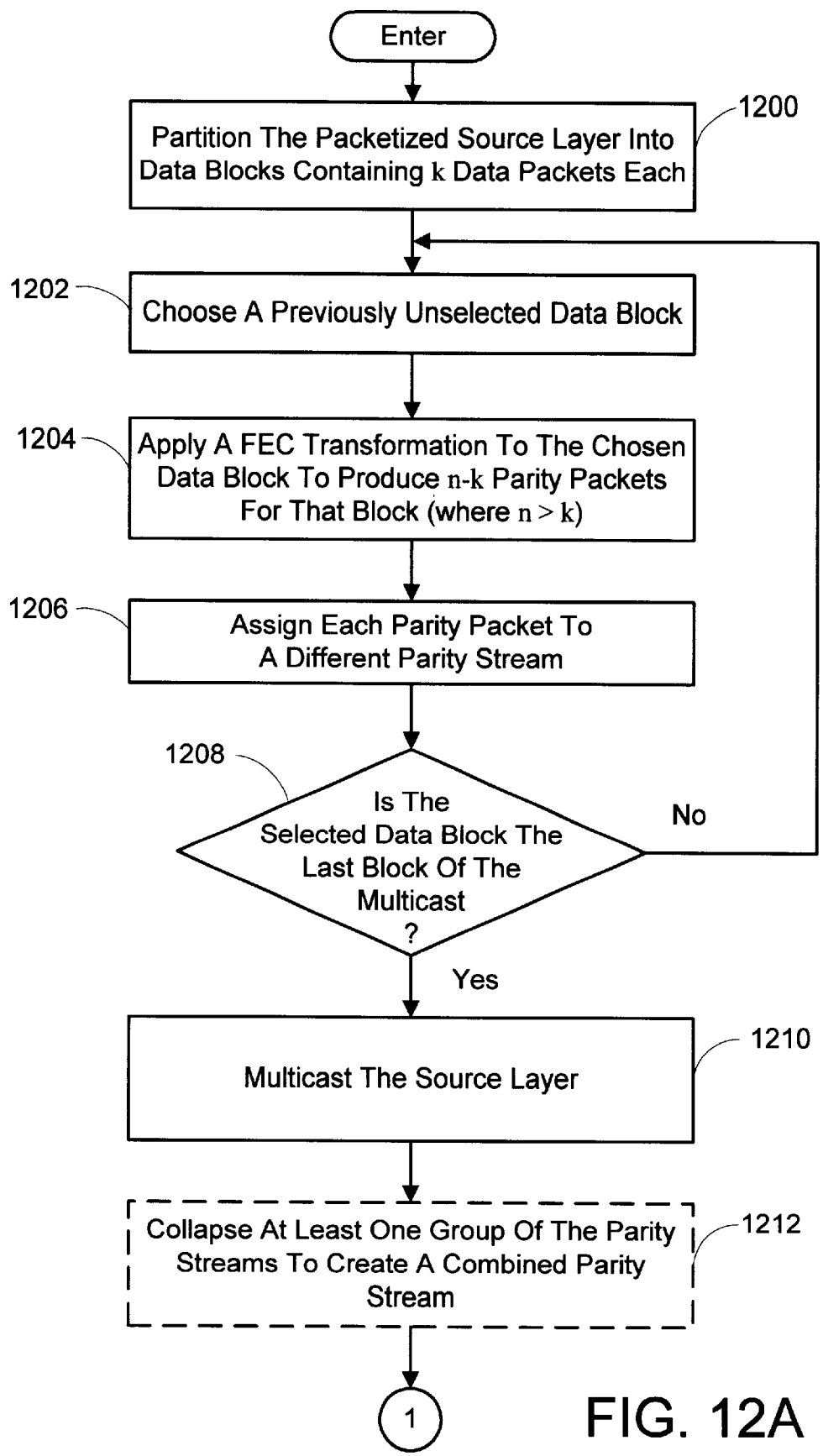
FIGS. 12A and 12B are block diagrams of a process for practicing the receiver-based, layered, error correction multicast system according to the present invention wherein parity layers to be used in the error correction are generated using a hybrid FEC/pseudo-ARQ error correction technique.
Figure 12B:
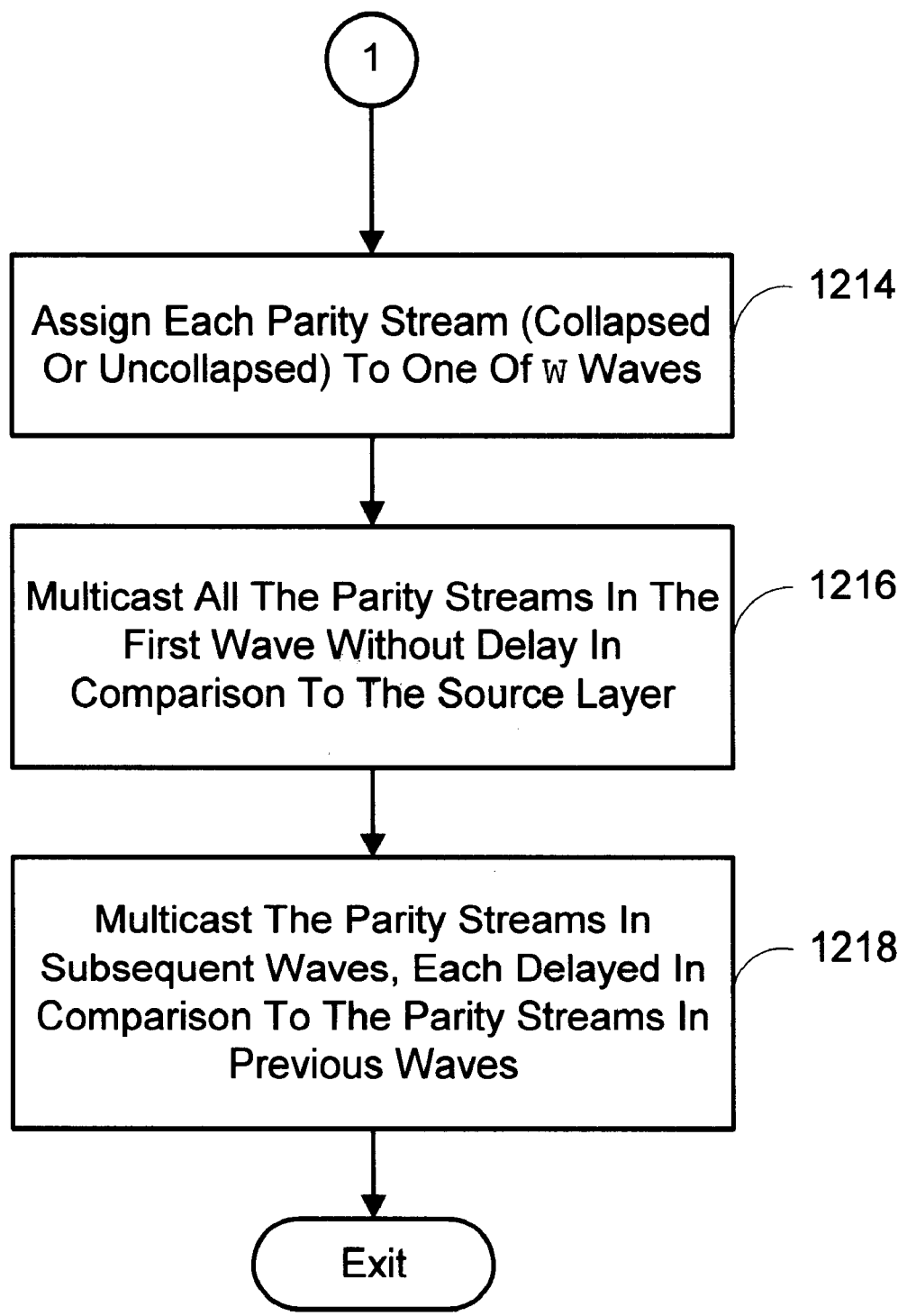

Referring now to FIGS. 12A and 12B, the overall process for creating a receiver-driven layered multicast with a hybrid FEC/pseudo-ARQ error correction capability for one source layer will be described. The process involved in receiving this multicast and replacing lost source layer data packets will then be explained in reference to FIGS. 13A and 13B. The network part of the process is not provided as it is identical to that described previously. It is noted that identical processes can be performed for every other source layer to incorporate the hybrid error correction capability.

In step 1200 of FIG. 12A, the broadcaster begins by partitioning the packetized source layer into data blocks containing k data packets each. Next, a previously unselected data block is selected (step 1202), and a FEC transformation is applied to the chosen data block to produce n–k parity packets for that block (step 1204). Each parity packet is then assigned to a different parity stream in step 1206. As indicated in step 1208, each subsequent data block of the source layer is processed in the same way by repeating steps 1202 through 1206. Once every parity packet has been assigned to a parity stream, the broadcaster multicasts the source layer (step 1210). At this point, the broadcaster can optionally collapse at least one group of parity streams to create a combined parity stream, as indicated in step 1212 by the broken line box. The broken line box is used throughout this description to indicate optional steps. The collapsing process essentially combines some or all the parity streams of a particular wave into a single stream. In this case, the parity packets associated with a particular source layer block will have to be staggered in time so that they can be transmitted in sequence in the collapsed stream. These collapsed streams can be generated by combining already produced parity streams, as depicted in FIG. 12A, However, alternatively they can be generated from scratch by assigning a prescribed number of parity packets associated with a particular source layer block to the same parity stream. It is noted that the foregoing processes associated with the generation of parity streams can be accomplished ahead of time and the parity streams stored until the time of the multicast. However, alternatively, the parity streams can be produced and multicast as each block of the source layer is multicast, thus resulting in a real-time generation of the parity streams and no need to store them.

Referring to FIG. 12B, the next step 1214 in the process is to assign each parity stream to one of w waves. In the context of creating the aforementioned waves, the term parity stream will be used in a broad sense to includes both collapsed and uncollapsed streams. Thus, a wave can be made up of all uncollapsed streams, all collapsed streams, or a combination of both. In step 1216, all the parity streams in the first wave are multicast without any delay in comparison to the source layer. The parity streams in subsequent waves are also multicast, except that each is delayed in comparison to the parity streams in the wave immediately preceding it (step 1218). The delay times are chosen as described in connection with the pure pseudo-ARQ error correction technique.

Figure 13A:
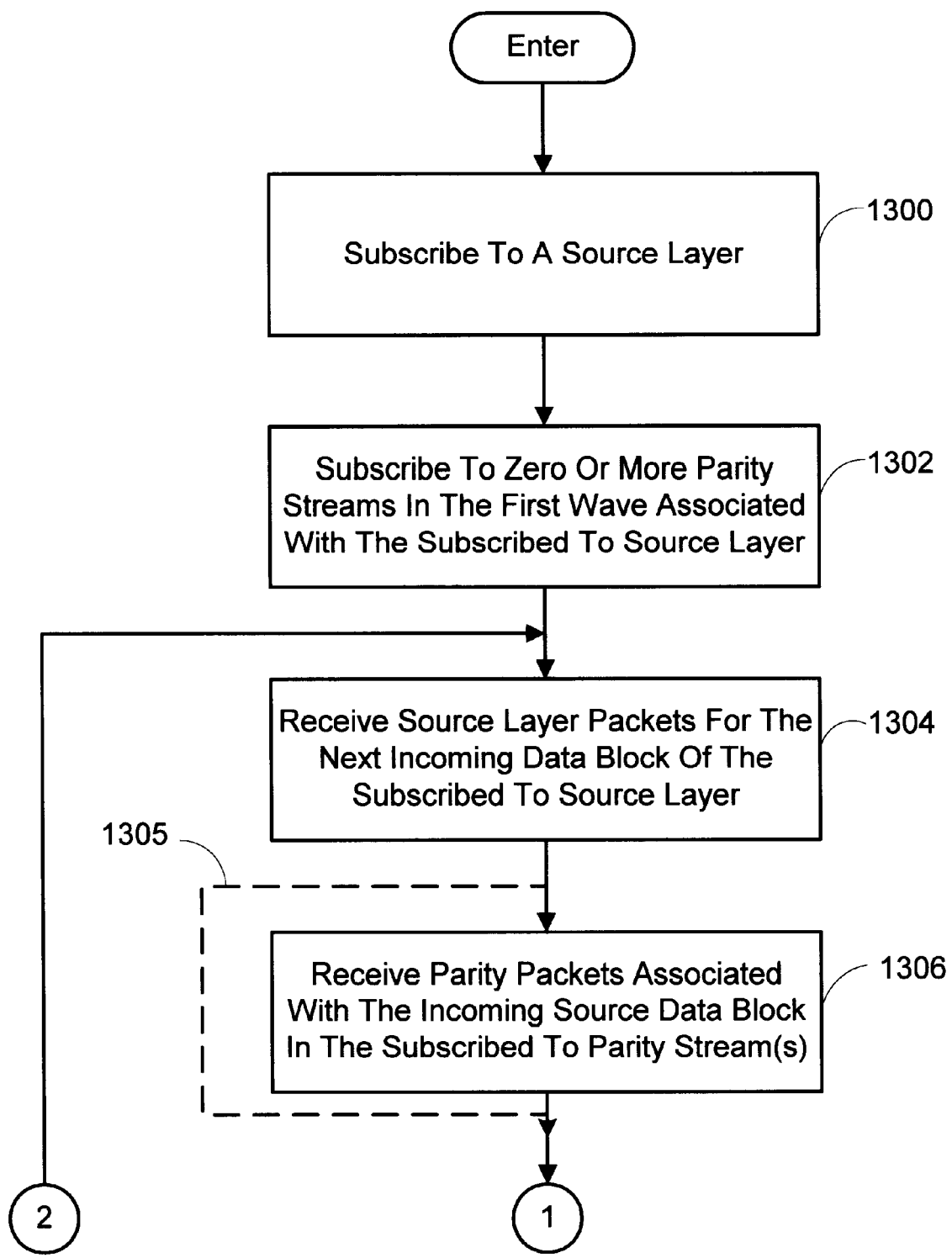
FIGS. 13A and 13B are block diagrams of a process for practicing the receiver-based, layered, error correction multicast system according to the present invention wherein a receiver subscribes to the parity streams generated by the process of FIGS. 12A and 12B and uses the parity streams to replace source layer packets lost during transmission.

Referring to FIG. 13A, the receiver's part of the process begins in step 1300 with subscribing to a source layer. In addition, the receiver subscribes to one or more parity streams in the first wave associated with the subscribed to source layer, or to none at all (step 1302). The next step 1304 in the hybrid process involves receiving source layer packets for the incoming data block of the subscribed to source layer. If at least one parity stream was subscribed to in step 1302, then in step 1306, parity packets associated with the incoming data block are received in the subscribed to parity stream(s). However, in the case where no parity streams from the first wave are subscribed to, step 1306 would not apply. This latter scenario is designated in FIG. 13A by the dashed line arrow by-passing step 1306.

Figure 13B:
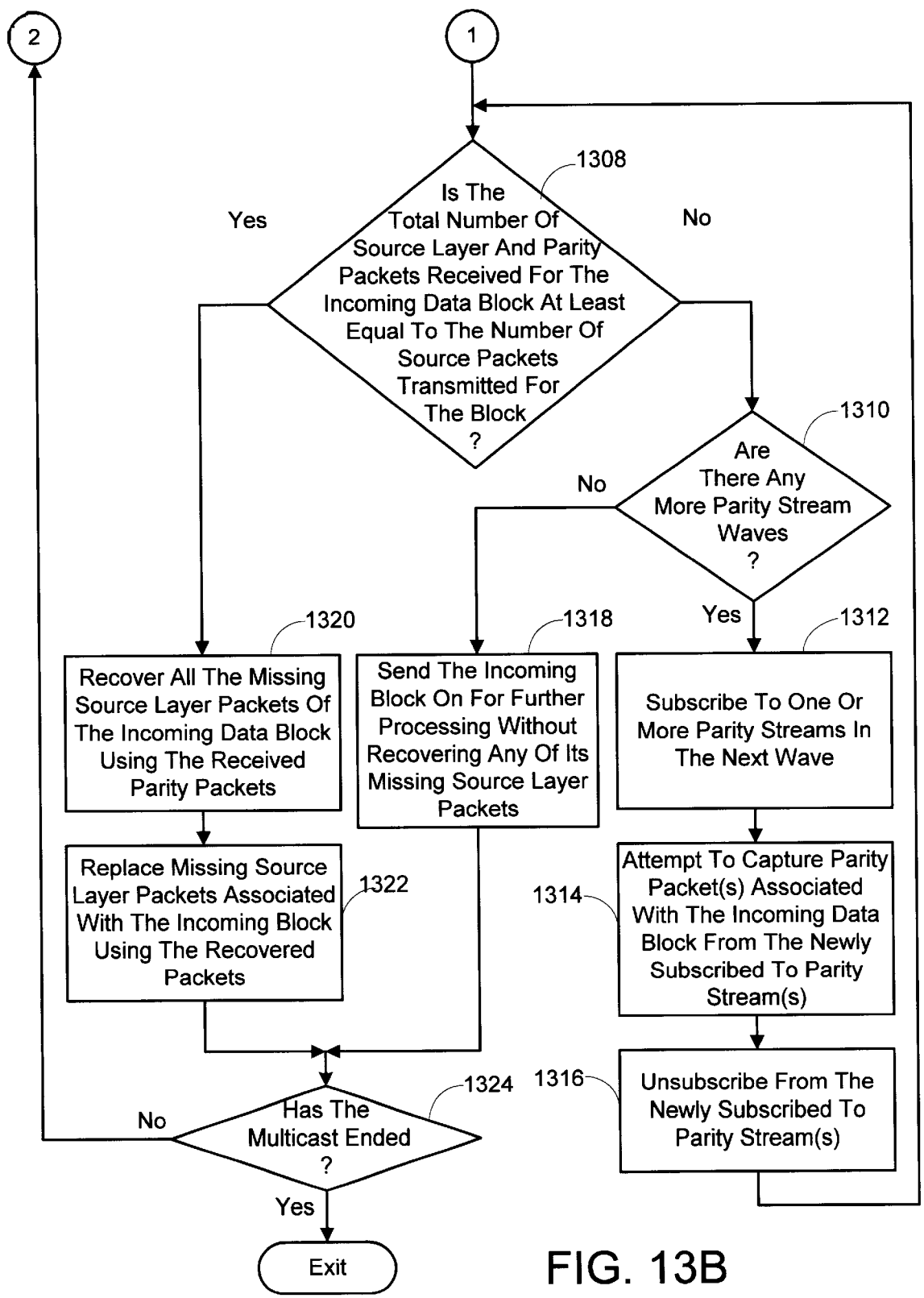

Referring now to FIG. 13B, it is next determined whether the total number of the source layer and parity packets received is at least equal to the number of source packets transmitted for the block, as indicated in step 1308. This could be accomplished as before by employing the sequence numbers these packets typically have embedded within the data making up the packet. If it is determined that the total number of source layer and parity stream packets received for the incoming block equal or exceed the number of source packets transmitted for that block, then all the missing source layer packets in the block are recovered using the received parity packets (step 1320). This is accomplished by solving Equation (1) for the particular FEC code employed. The missing source layer packets associated with the incoming data block are replaced with the aforementioned recovered packets in step 1322. If, however, it is determined that the total number of source layer and parity stream packets received for the incoming block do not equal or exceed the number of source packets transmitted for that block, the next step in the hybrid process is to determine whether there are any more parity stream waves available for subscription (step 1310). If there are parity streams available, in step 1312 one or more parity streams in the next wave (i.e., the wave having parity packets that are delayed less than any other previously unselected wave) are subscribed to, as desired. An attempt is then made in step 1314 to capture parity packet(s) associated with the incoming data block from the newly subscribed to parity stream(s). Once the foregoing parity package capture procedure is complete, the receiver unsubscribes from the parity streams(s) in step 1316, and the process of steps 1308 through 1316 is repeated (or steps 1308 and 1320/1322 in the case where sufficient parity packages have been captured). If, on the other hand, it is determined that there are no more parity stream waves available for subscription, then the incoming block is sent on for further process without recovering any of its missing packets (step 1318).

Finally, as indicated in step 1324, the foregoing recovery process of steps 1304 through 1322 is repeated for each successive incoming data block until the multicast ends. Preferably, this is accomplished as each block arrives so as to minimize the delay in reconstructing the video and/or audio signal from the source layers and to minimize the amount of data that needs to be stored.

What is claimed is:

1. A computer-implemented error correction process for use in a receiver-driven layered multicast of real-time media over a heterogeneous packet network to a plurality of receivers, wherein the real-time media is transmitted over the network in multiple streams of packetized source data forming hierarchical layers of information, said error correction process comprising using a computer to perform the following step:

multicasting at least one stream of packetized error correction information for at least one of the streams of packetized source data, wherein each stream of packetized error correction information is capable of being used by a receiver to assist in the recovery of packets of source data lost during transmission.

2. The process of claim 1 wherein the step of multicasting streams of packetized error correction information comprises the steps of:

associating each stream of packetized error correction information with a one of the multiple streams of packetized source data; and incorporating in each error correction stream information necessary to assist a receiver in recovering said packets of lost source data belonging to the particular stream of packetized source data associated with the error correction stream.

3. The process of claim 2, wherein there are multiple streams of error correction information associated with each stream of source data, and wherein the incorporating step comprises the step of incorporating error correction information in each error correction stream associated with the same source data stream which makes the streams redundant, said redundant streams making it possible for a receiver to employ more than one error correction stream and obtain a desired amount of the error correction information needed to replace packets in an associated source data stream that were lost during the transmission even if some of the error correction stream packets themselves are lost in transmission.

4. The process of claim 3, wherein the step of multicasting streams of packetized error correction information comprises the step of incorporating an identifier into each packet in each of the streams of packetized error correction information wherein a different identifier is employed for each of the error correction information streams, thereby allowing each receiver to select the number of error correction information streams to be received by specifying that only packets having particular identifiers be routed over the network to the receiver.

5. The process of claim 4, further comprising the step of a receiver improving the quality of the received broadcast by first selecting a desired number of source data streams while leaving enough bandwidth available to also select a number of error correction information streams for one or more of the source streams that will compensate, at least partially, for an inherent packet loss rate associated with the receivers connection to the network, and then selecting said number of error correction information streams.

6. A computer-implemented process for multicasting real-time media over a heterogeneous packet network to a plurality of receivers, comprising using a computer to perform the following steps:

forming a series of source data streams from a media signal, said source data streams comprising a base layer representing the media signal at a least acceptable level of quality, and at least one enhancement layer which when combined with the base layer improves the level of quality of the media signal derivable therefrom;

for each source data stream, creating at least one error correction information stream from the source layer, each error correction stream comprising a series of data packets that can be used by a receiver to assist in the recovery of data packets of the associated source layer that may be lost during transmission;

respectively multicasting each source layer and error correction layer to a different network address for routing on to a receiver.

7. A computer-implemented process for a receiver to receive a real-time media multicast over a heterogeneous packet network wherein the real-time media is transmitted over the network in multiple streams of packetized source data forming hierarchical layers of information and associated error correction streams, comprising using a computer to perform the following steps:

determining a currently available bandwidth associated with the receiver's connection to the network;

determining a current packet loss rate associated with receiving data over the network;

selecting at least one source data stream and at least one associated error correction information stream which are to be received so as to allow the best possible level of quality in a media signal reconstructed from received source data streams, wherein said selecting is based on the currently available bandwidth and the current packet loss rate;

subscribing over the network to the selected source data streams and error correction information streams, and receiving the same;

using the received error correction information stream or streams associated with each received source data stream to assist in the recovery of packets of that source data stream which were lost during transmission to produce a recovered source data stream; and reconstruct the media signal from the recovered source data stream or streams.

8. The process of claim 7, further comprising the step of continuously monitoring the available bandwidth and packet loss rate and repeating the selection and subscription steps as needed to maintain the best level of quality of the reconstructed media signal as possible.

9. The process of claim 8, wherein the monitoring step comprises the steps of:

rechecking the available bandwidth and packet loss rate periodically during the multicast of the real-time media;

determining whether the available bandwidth has changed more than a prescribed maximum bandwidth change threshold;

determining whether the packet loss rate has changed more than a prescribed maximum packet loss rate change threshold; and repeating the selection and subscription steps whenever either or both of the prescribed thresholds is exceeded.

10. A computer-implemented error correction system for use in a receiver-driven layered multicast of real-time media over a heterogeneous packet network to a plurality of receivers, wherein the real-time media is transmitted over the network in multiple streams of packetized source data forming hierarchical layers of information, said error correction system comprising:

a broadcaster capable of multicasting at least one stream of packetized error correction information for at least one of the streams of packetized source data; and at least one receiver, each of which is capable of using a stream of packetized error correction information associated with a particular source data stream to assist in the recovery of packets of that source data lost during transmission.

11. The system of claim 10, wherein the broadcaster comprises:

an encoder and packetizer module capable of producing said multiple stream of packetized source data form a media signal; and at least one error correction module, wherein each error correction module is capable producing at least one stream of packetized error correction information from a stream of packetized source data and thereafter multicasting each source data stream and its associated error correction streams onto the network.

12. The system of claim 10, wherein each receiver comprises:

a subscription module capable of instructing the network to route particular ones of the source data streams and error correction streams to the receiver;

at least one recovery module capable of receiving a source data stream and its associated error correction stream or streams, and thereafter using each error correction stream received to assist in the recovery of packets identical to those of the source data stream that were lost during transmission and inserting the recovered packets into the source data stream to produce a recovered source data stream; and a unpacketizer and decoder module for reconstructing a media signal from the recovered source data stream or streams.

13. The system of claim 12, wherein each receiver further comprises a subscription optimization module capable of instructing the subscription module which source data streams and which error correction streams to request from the network, wherein the subscription optimization module instructs the subscription module based on the number of source data streams it is desired to receive so as to obtain a desired quality in the media signal, while leaving enough bandwidth available to also select a number of error correction information streams for one or more of the source streams that will compensate, at least partially, for an inherent packet loss rate associated with the receiver's connection to the network.

14. An error correction system for use in a receiver-driven layered multicast of real-time media over a heterogeneous packet network to a plurality of receivers, wherein the real-time media is transmitted over the network in multiple streams of packetized source data forming hierarchical layers of information, said error correction process comprising:

a general purpose computing device;
a computer program comprising program modules executable by the computing device, wherein the computing device is directed by the program modules of the computer program to,
multicast at least one stream of packetized error correction information for at least one of the streams of packetized source data, wherein each stream of packetized error correction information is capable of being used by a receiver to assist in the recovery of packets of source data lost during transmission.

15. The system of claim 14 wherein the program module for multicasting streams of packetized error correction information comprises sub-modules for:

associating each stream of packetized error correction information with a one of the multiple streams of packetized source data; and
incorporating in each error correction stream information necessary to assist a receiver in recovering said packets of lost source data belonging to the particular stream of packetized source data associated with the error correction stream.

16. The system of claim 15, wherein there are multiple streams of error correction information associated with each stream of source data, and wherein the incorporating sub-module comprises a sub-module for incorporating error correction information in each error correction stream associated with the same source data stream which makes the streams redundant, said redundant streams making it possible for a receiver to employ more than one error correction stream and obtain a desired amount of the error correction information needed to replace packets in an associated source data stream that were lost during the transmission even if some of the error correction stream packets themselves are lost in transmission.

17. The system of claim 16, wherein the program module for multicasting streams of packetized error correction information comprises a sub-module for incorporating an identifier into each packet in each of the streams of packetized error correction information wherein a different identifier is employed for each of the error correction information streams, thereby allowing each receiver to select the number of error correction information streams to be received by specifying that only packets having particular identifiers be routed over the network to the receiver.

18. The system of claim 17, further comprising a program module for a receiver improving the quality of the received broadcast by first selecting a desired number of source data streams while leaving enough bandwidth available to also select a number of error correction information streams for one or more of the source streams that will compensate, at least partially, for an inherent packet loss rate associated with the receiver's connection to the network, and then selecting said number of error correction information streams.

19. An error correction system for multicasting real-time media over a heterogeneous packet network to a plurality of receivers, comprising:

a general purpose computing device;
a computer program comprising program modules executable by the computing device, wherein the computing device is directed by the program modules of the computer program to,
form a series of source data streams from a media signal, said source data streams comprising a base layer representing the media signal at a least acceptable level of quality, and at least one enhancement layer which when combined with the base layer improves the level of quality of the media signal derivable therefrom.
for each source data stream, create at least one error correction information stream from the source layer, each error correction stream comprising a series of data packets that can be used by a receiver to assist in the recovery of data packets of the associated source layer that may be lost during transmission, and
respectively multicast each source layer and error correction layer to a different network address for routing on to a receiver.

20. An error correction system for allowing a receiver to receive a real-time media multicast over a heterogeneous packet network wherein the real-time media is transmitted over the network in multiple streams of packetized source data forming hierarchical layers of information and associated error correction streams, comprising:

a general purpose computing device;
a computer program comprising program modules executable by the computing device, wherein the computing device is directed by the program modules of the computer program to,
determine a currently available bandwidth associated with the receiver's connection to the network,
determine a current packet loss rate associated with receiving data over the network,
select at least one source data stream and at least one associated error correction information stream which are to be received so as to allow the best possible level of quality in a media signal reconstructed from received source data streams, wherein said selecting is based on the currently available bandwidth and the current packet loss rate,
subscribe over the network to the selected source data streams and error correction information streams, and receiving the same,
use the received error correction information stream or streams associated with each received source data stream to assist in the recovery of packets of that source data stream which were lost during transmission to produce a recovered source data stream, and
reconstruct the media signal from the recovered source data stream or streams.

21. The system of claim 20, further comprising a program module for continuously monitoring the available bandwidth and packet loss rate and repeating the selection and subscription steps as needed to maintain the best level of quality of the reconstructed media signal as possible.

22. The system of claim 21, wherein the monitoring sub-module comprises sub-modules for:

rechecking the available bandwidth and packet loss rate periodically during the multicast of the real-time media;

determining whether the available bandwidth has changed more than a prescribed maximum bandwidth change threshold;

determining whether the packet loss rate has changed more than a prescribed maximum packet loss rate change threshold; and repeating the selection and subscription steps whenever either or both of the prescribed thresholds is exceeded.

23. A computer-readable memory for use in a receiver-driven layered multicast of real-time media over a heterogeneous packet network to a plurality of receivers, wherein the real-time media is transmitted over the network in multiple streams of packetized source data forming hierarchical layers of information, comprising:

a computer-readable storage medium; and a computer program comprising program modules stored in the storage medium, wherein the storage medium is so configured by the computer program that it causes the computer to, multicast at least one stream of packetized error correction information for at least one of the streams of packetized source data, wherein each stream of packetized error correction information is capable of being used by a receiver to assist in the recovery of packets of source data lost during transmission.

24. The computer-readable memory of claim 23 wherein the program module for multicasting streams of packetized error correction information comprises sub-modules for:

associating each stream of packetized error correction information with a one of the multiple streams of packetized source data; and incorporating in each error correction stream information necessary to assist a receiver in recovering said packets of lost source data belonging to the particular stream of packetized source data associated with the error correction stream.

25. The computer-readable memory of claim 24, wherein there are multiple streams of error correction information associated with each stream of source data, and wherein the incorporating sub-module comprises a sub-module for incorporating error correction information in each error correction stream associated with the same source data stream which makes the streams redundant, said redundant streams making it possible for a receiver to employ more than one error correction stream and obtain a desired amount of the error correction information needed to replace packets in an associated source data stream that were lost during the transmission even if some of the error correction stream packets themselves are lost in transmission.

26. The computer-readable memory of claim 25, wherein the program module for multicasting streams of packetized error correction information comprises a sub-module for incorporating an identifier into each packet in each of the streams of packetized error correction information wherein a different identifier is employed for each of the error correction information streams, thereby allowing each receiver to select the number of error correction information streams to be received by specifying that only packets having particular identifiers be routed over the network to the receiver.

27. The computer-readable memory of claim 26, further comprising a program module for a receiver improving the quality of the received broadcast by first selecting a desired number of source data streams while leaving enough bandwidth available to also select a number of error correction information streams for one or more of the source streams that will compensate, at least partially, for an inherent packet loss rate associated with the receiver's connection to the network, and then selecting said number of error correction information streams.

28. A computer-readable memory for multicasting real-time media over a heterogeneous packet network to a plurality of receivers, comprising:

a computer-readable storage medium; and a computer program comprising program modules stored in the storage medium, wherein the storage medium is so configured by the computer program that it causes the computer to, form a series of source data streams from a media signal, said source data streams comprising a base layer representing the media signal at a least acceptable level of quality, and at least one enhancement layer which when combined with the base layer improves the level of quality of the media signal derivable therefrom.

for each source data stream, create at least one error correction information stream from the source layer, each error correction stream comprising a series of data packets that can be used by a receiver to assist in the recovery of data packets of the associated source layer that may be lost during transmission, and respectively multicast each source layer and error correction layer to a different network address for routing on to a receiver.

29. A computer-readable memory for allowing a receiver to receive a real-time media multicast over a heterogeneous packet network wherein the real-time media is transmitted over the network in multiple streams of packetized source data forming hierarchical layers of information and associated error correction streams, comprising:

a computer-readable storage medium; and a computer program comprising program modules stored in the storage medium, wherein the storage medium is so configured by the computer program that it causes the computer to, determine a currently available bandwidth associated with the receiver's connection to the network, determine a current packet loss rate associated with receiving data over the network, select at least one source data stream and at least one associated error correction information stream which are to be received so as to allow the best possible level of quality in a media signal reconstructed from received source data streams, wherein said selecting is based on the currently available bandwidth and the current packet loss rate, subscribe over the network to the selected source data streams and error correction information streams, and receiving the same, use the received error correction information stream or streams associated with each received source data stream to assist in the recovery of packets of that source data stream which were lost during transmission to produce a recovered source data stream, and reconstruct the media signal from the recovered source data stream or streams.

30. The computer-readable memory of claim 29, further comprising a program module for continuously monitoring the available bandwidth and packet loss rate and repeating the selection and subscription steps as needed to maintain the best level of quality of the reconstructed media signal as possible.

31. The computer-readable memory of claim 30, wherein the monitoring sub-module comprises sub-modules for:

rechecking the available bandwidth and packet loss rate periodically during the multicast of the real-time media;

determining whether the available bandwidth has changed more than a prescribed maximum bandwidth change threshold;

determining whether the packet loss rate has changed more than a prescribed maximum packet loss rate change threshold; and repeating the selection and subscription steps whenever either or both of the prescribed thresholds is exceeded.

\* \* \* \* \*

UNITED STATES PATENT AND TRADEMARK OFFICE
CERTIFICATE OF CORRECTION

PATENT NO.   : 6,532,562 B1
DATED        : March 11, 2003
INVENTOR(S)  : Chou et al.

It is certified that error appears in the above-identified patent and that said Letters Patent is hereby corrected as shown below:

<u>Title page,</u>
Insert the following information:
-- [73]   Assignee:  Microsoft Corporation, Redmond, WA (US) --

Signed and Sealed this

Fourth Day of November, 2003

JAMES E. ROGAN
*Director of the United States Patent and Trademark Office*